United States Patent
Pourboghrat et al.

(10) Patent No.: US 10,160,156 B2
(45) Date of Patent: Dec. 25, 2018

(54) APPARATUS AND METHODS FOR THERMOHYDROFORMING

(71) Applicant: BOARD OF TRUSTEES OF MICHIGAN STATE UNIVERSITY, East Lansing, MI (US)

(72) Inventors: Farhang Pourboghrat, Dublin, OH (US); Nicholas E. Kuuttila, Redondo Beach, CA (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 488 days.

(21) Appl. No.: 14/927,595

(22) Filed: Oct. 30, 2015

(65) Prior Publication Data
US 2016/0129495 A1 May 12, 2016

Related U.S. Application Data

(60) Provisional application No. 62/073,150, filed on Oct. 31, 2014.

(51) Int. Cl.
*B29C 51/26* (2006.01)
*B29C 51/08* (2006.01)
*B21D 26/021* (2011.01)

(52) U.S. Cl.
CPC .......... *B29C 51/262* (2013.01); *B21D 26/021* (2013.01); *B29C 51/08* (2013.01)

(58) Field of Classification Search
CPC ........ B21D 7/04; B21D 26/02; B21D 26/021; B21D 26/031; B21D 22/02; B21D 22/205; B29C 51/18; B29C 51/20; B29C 51/08; B29C 51/262
See application file for complete search history.

(56) References Cited

U.S. PATENT DOCUMENTS 5,261,808 A * 11/1993 Onoe .................. B21D 22/205
                                                    425/387.1
6,631,630 B1   10/2003 Pourboghrat et al.

FOREIGN PATENT DOCUMENTS

JP            08150420 A  *  6/1996  ........... B21D 22/205

OTHER PUBLICATIONS

EPO Machine Translation of JP 08150420 A; Jul. 2018.*

* cited by examiner

*Primary Examiner* — Pradeep C Battula
(74) *Attorney, Agent, or Firm* — Marshall, Gerstein & Borun LLP

(57) ABSTRACT

The disclosure relates to punch die apparatus, related thermoforming press apparatus, and methods for thermohydroforming die-punched parts formed therefrom, in particular from sheet blank substrates such as polymer composite materials and metals. The disclosure further relates to thermohydroforming blanks incorporating a vacuum-sealed outer film, in particular polymer composite blanks which can be used in combination with the disclosed apparatus. The apparatus and methods are particularly suitable for thermohydroforming parts with complex deep drawn geometries yet which retain relatively smooth outer surfaces and internal material structure. The apparatus and methods provide a fast and efficient means for composite part manufacturing.

24 Claims, 14 Drawing Sheets

APPARATUS AND METHODS FOR THERMOHYDROFORMING

CROSS REFERENCE TO RELATED APPLICATION

Priority is claimed to U.S. Provisional Application No. 62/073,150 (filed on Oct. 31, 2014), which is incorporated herein by reference in its entirety.

STATEMENT OF GOVERNMENT INTEREST

This invention was made with government support under W56HZV-07-C-0355 and W56HZV-07-2-0001 awarded by the United States Army Tank Automotive Research Development and Engineering Center. The government has certain rights in the invention.

BACKGROUND OF THE DISCLOSURE

Field of the Disclosure

The disclosure relates to punch die apparatus, related thermoforming press apparatus, and methods for thermohydroforming die-punched parts formed therefrom, in particular from sheet blank substrates such as polymer composite materials and metals. The disclosure further relates to thermohydroforming blanks incorporating a vacuum-sealed outer film, in particular polymer composite blanks which can be used in combination with the disclosed apparatus.

Brief Description of Related Technology

Pourboghrat et al. U.S. Pat. No. 6,631,630 is directed to apparatus and methods which use hydroforming to shape complex structures from materials such as sheet metal or composites. In particular, apparatus and methods for shaping complex structures using composites such as continuous-fiber or woven fiber composites with limited wrinkling or rupture of the composite during the shaping process are disclosed.

SUMMARY

The disclosure relates to punch die apparatus, related thermoforming press apparatus, and methods for thermohydroforming die-punched parts formed therefrom, in particular from sheet blank substrates such as polymer composite materials (e.g., thermoplastic or thermoset polymeric composites) and metals. The disclosure further relates to thermohydroforming blanks incorporating a vacuum-sealed outer film, in particular polymer composite blanks which can be used in combination with the disclosed apparatus. The apparatus and methods are particularly suitable for thermohydroforming parts with complex deep drawn geometries yet which retain relatively smooth outer surfaces and internal material structure (e.g., local orientation of composite reinforcement materials relative to initial local orientation and local blank substrate surface is substantially maintained in a formed part). The apparatus and methods provide a fast and efficient means for composite part manufacturing.

Thermohydroforming a part with the disclosed apparatus and methods can produce a far superior end part when compared with a comparable matched die molding process, in part due to the use of a pressurized fluid to form the part. The pressurized fluid provides consistent and uniform forming force that is normal to the composite surface at every point. This forming force is far easier to model that the complex forces exerted by the dies used in match die molding, where complex contact algorithms are needed to predict the way in which the composite slides between the dies as it is being pressed into shape. This complex contact generally leads to an unexpected and low quality result as the forces exerted by the forming dies do not act normal to the formed surface and develop large shear stresses, especially in deep drawn parts where the direction that the dies traverse becomes aligned with the surface of the formed part. Low quality results are frequently characterized by unpredictable, out-of-plane warping (or wrinkling) of a part formed by a matched die molding process. The pressurized fluid in the disclosed thermohydroforming process helps prevent localized material thickening, which otherwise could lead to wrinkling in the final part. Instead, the pressurized fluid forces the composite to take the shape of the forming punch and desirably induces in-plane material shearing (i.e., as opposed to out-of-plane material shearing or warping). This is a distinct advantage provided by the disclosed apparatus and related thermohydroforming methods relative to other composite forming processes.

A variety of parts can be formed using the disclosed apparatus and methods, in particular deep drawn polymer composite parts characterized by a relative absence of surface wrinkling. Wrinkling is undesirable in a formed part, because it can adversely affect the functional properties of the part, for example causing delamination of the part (e.g., layer separation in a composite part) and/or reducing mechanical properties of the part (e.g., tensile properties such as strength, stiffness, etc.). Suitably, the formed part is relatively free from surface wrinkling such that there is essentially no delamination and/or the part's mechanical properties are at least 90%, 95%, 98%, or 99% and/or up to 100% of the equivalent property for a part completely free from wrinkles. Wrinkling also is aesthetically undesirable, and it is preferably avoided when using the disclosed apparatus and methods, in particular in the working or functional portion of the formed part (e.g., some wrinkling in peripheral regions to be trimmed from the final part is possible). For deep drawn parts and in related methods for making the same, the part to be shaped is permitted to move during the forming process, because the part is hydrostatically clamped against one die surface and is otherwise held in place by pressurized forming fluid at other surfaces (i.e., as opposed to being fixed in place with solid-solid clamping interfaces). Thermohydroforming using the disclosed apparatus and methods can form deep drawn parts with relatively large aspect ratios, for example having a depth (D)/width (W) ratio of at least about 0.5, 0.7, 1, 2, or 5 and/or up to about 1, 2, 5, 10, or 20. The depth of a formed part generally corresponds to the height of the part in a primary deformation direction (e.g., direction corresponding to the travel path of a forming die punch), for example a maximum normal distance between a base plane defined by an open (bottom) area and an opposing (top) solid surface of the formed part. The width of a formed part generally corresponds to a minimum lateral distance between opposing solid surfaces in the base plane (e.g., diameter of a circular base plane, minor axis of an elliptical base plane).

The formed parts generally can have any desired shape or geometry. Parts particularly suited for manufacture using the disclosed apparatus and methods include those made from polymeric composite materials (e.g., a composite material alone or a laminate structure including a composite material along with one or more other composite materials, non-composite polymeric materials, metals, etc.), for example where high strength and low weight are desired properties of the formed part. Examples of suitable parts include personal protective equipment for military, law enforcement, sporting, or other uses (e.g., helmets or body armor/padding, such as for the torso, arms, or legs). Other suitable parts include automotive, aerospace, or nautical parts (e.g., external or internal panels or other structure for automobiles, planes, boats, or other vehicles). In other embodiments, the formed parts can be used as a protective shell or casing, such as for various electronic devices (e.g., tablet computer, smart phone, cell phone).

In one aspect, the disclosure relates to a punch die including: (a) an upper die having a top surface and a lower clamping surface opposing the top surface, the upper die including or defining a punch cavity extending through the upper die, the punch cavity being adapted to receive a punch; and (b) a lower die having a bottom surface and an upper clamping surface opposing the bottom surface, the lower die including or defining a forming cavity extending into the lower die through the upper clamping surface and being bounded below, the forming cavity being adapted to receive a punch extending completely through the punch cavity and at least partially into the forming cavity; wherein at least one of the upper die and the lower die include a means for moveably connecting and circumferentially sealing the upper die and the lower die at an interfacial region between the lower clamping surface and the upper clamping surface such that, when the upper die and the lower die are moveably connected and circumferentially sealed: (i) the upper die and the lower die together create or define a variable-volume interfacial clamping cavity between the lower clamping surface and the upper clamping surface, (ii) the interfacial clamping cavity is in fluid communication with the punch cavity and the forming cavity, and (iii) the upper die and the lower die are moveable relative to each other to vary the interfacial clamping cavity volume while maintaining a circumferential seal between the lower clamping surface and the upper clamping surface.

In another aspect, the disclosure relates to a thermohydroforming press assembly including: (a) a punch die according to any of the variously disclosed embodiments; (b) a punch positioned relative to the punch die and adapted to extend through the punch cavity and at least partially into the forming cavity; (c) optionally a press base to which the lower die is mounted; (d) optionally one or more axial support members mounted to the press base at a first end of the support members and extending axially upward from the press base and above the lower die; (e) optionally a fixed support mounted to the support members at a second end opposing the first end of the support members; and (f) optionally an axially traversable clamping plate moveably mounted to the fixed support, the clamping plate further having the upper die mounted thereto, wherein the clamping plate (when present) is axially moveable to engage the upper die and the lower die to form the interfacial clamping cavity volume and the circumferential seal between the lower clamping surface and the upper clamping surface.

In another aspect, the disclosure relates to a thermohydroforming blank including: (a) a blank substrate (e.g., a polymer composite material) having a top surface and a bottom surface opposing the top surface; (b) a release coating on the top surface and the bottom surface of the blank substrate; and (c) a vacuum-sealed film enclosing the blank substrate and in contact with the release coating thereon.

In another aspect, the disclosure relates to a thermohydroforming method including: (a) providing a thermohydroforming press assembly according to any of the variously disclosed embodiments (e.g., including a punch die as disclosed herein); (b) filling the forming cavity with a forming fluid; (c) placing a thermohydroforming blank on the upper clamping surface of the lower die; (d) engaging the upper die and the lower die (i) to contact the lower clamping surface of the upper die with the thermohydroforming blank and (ii) to define the interfacial clamping cavity and the circumferential seal therefor; (e) expanding the interfacial clamping cavity volume with the forming fluid under pressure, thereby (i) flooding the circumferentially sealed interfacial clamping cavity and forming cavity with forming fluid and (ii) disengaging the blank from the upper clamping surface of the lower die to hydrostatically clamp the blank against the lower clamping surface of the upper die; (f) extending the punch through the punch cavity to contact the blank and to form a die-punched formed blank; (g) circulating forming fluid through the forming cavity and in contact with the formed blank; (h) disengaging the upper die and the lower die; and (i) removing the formed blank from the punch die.

In another aspect, the disclosure relates to a thermohydroforming method including: (a) providing a thermohydroforming press assembly according to any of the variously disclosed embodiments (e.g., including a punch die as disclosed herein); (b) hydrostatically clamping a thermohydroforming blank against the lower clamping surface of the upper die with pressurized forming fluid flooding the forming cavity and the circumferentially sealed interfacial clamping cavity, the blank being disengaged from the upper clamping surface of the lower die; and (c) extending the punch through the punch cavity to contact the blank and to form a die-punched formed blank.

In another aspect, the disclosure relates to a thermohydroforming method including: (a) providing a thermohydroforming blank according to any of the variously disclosed embodiments (e.g., including an enclosing film and an optional release coating as disclosed herein); (b) clamping the thermohydroforming blank against one or more clamping surfaces of a punch die containing pressurized forming fluid in a forming cavity of the punch die; and (c) extending a punch through a punch cavity of the punch die to contact the blank and to form a die-punched formed blank in the forming cavity.

While the disclosed apparatus, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to punch die apparatus, related thermoforming press apparatus, and methods for thermohydroforming die-punched parts formed therefrom, in particular from sheet blank substrates such as polymer composite materials (e.g., thermoplastic or thermoset polymeric composites) and metals. The disclosure further relates to thermohydroforming blanks incorporating a vacuum-sealed outer film, in particular polymer composite blanks which can be used in combination with the disclosed apparatus. The apparatus and methods are particularly suitable for thermohydroforming parts with complex deep drawn geometries yet which retain relatively smooth outer surfaces and internal material structure (e.g., local orientation of composite reinforcement materials relative to initial local orientation and local blank substrate surface is substantially maintained in a formed part). The apparatus and methods provide a fast and efficient means for composite part manufacturing. The apparatus and methods produce larger parts more quickly and consistently while reducing or eliminating forming fluid contamination of the blank (e.g., due to the enclosing film).

Figure 2:
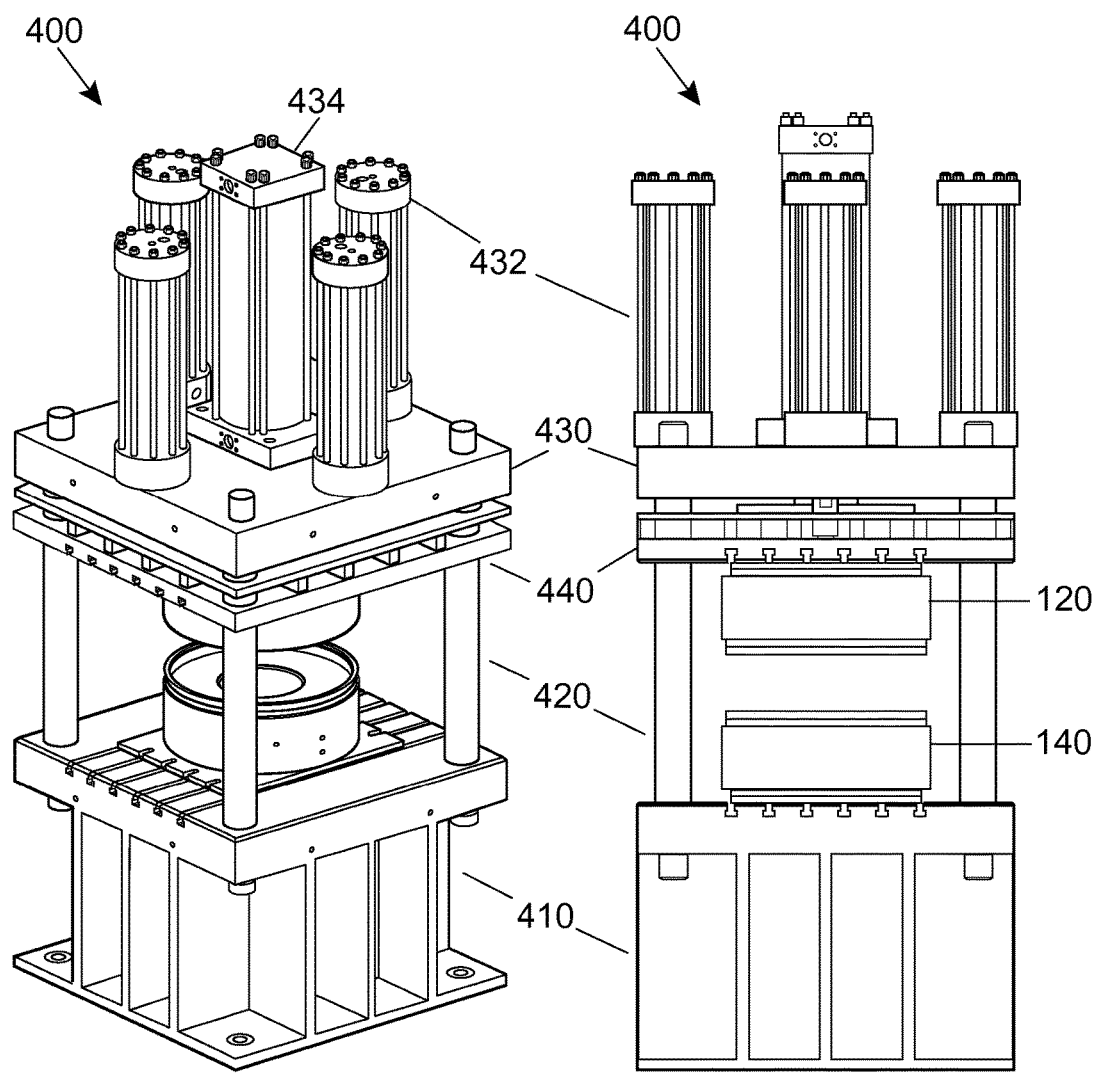
FIG. 2 provides an isometric and front view of a thermohydroforming (THF) press. The top plate is supported by four columns and houses five hydraulic rams. The four outer rams actuate the clamp which serves as an attachment point for the upper zone die. The clamp has a single degree of freedom which is constrained by the four columns. The central ram actuates the punch independently of the upper zone die making the press double acting.
Figure 3:
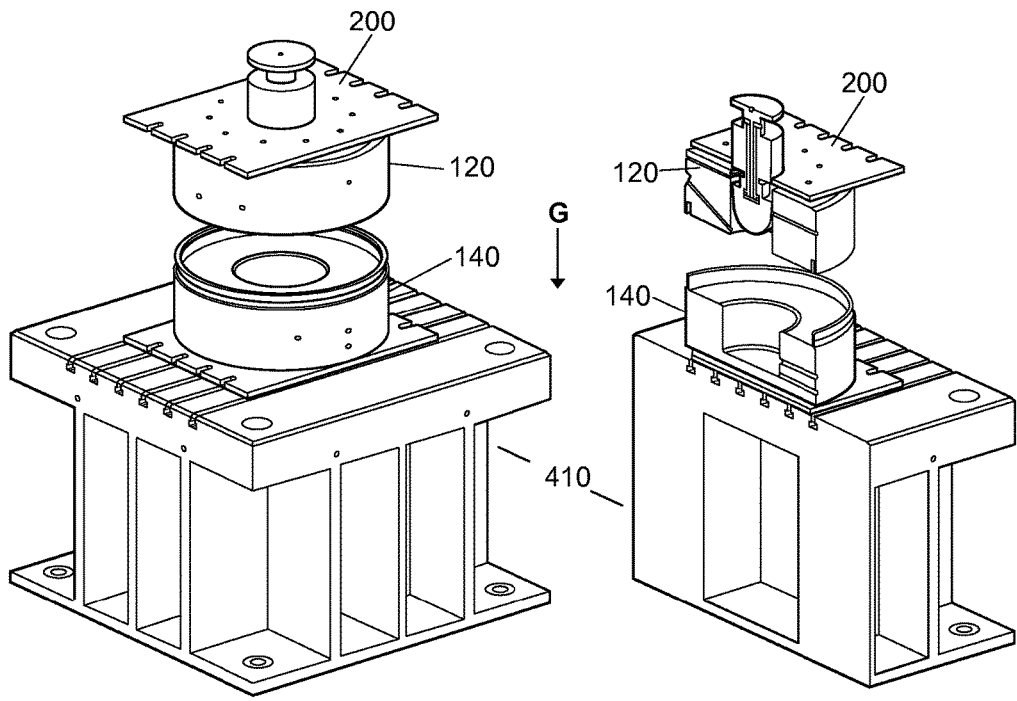
FIG. 3 illustrates the press without generic hydraulic components. A section view exposes the upper and lower zone dies cavities. The punch and punch ram adapter can be seen in the upper zone punch cavity.

The disclosed apparatus and methods provide a means by which sheet composites and/or sheet metal blank substrates can be formed into complex geometric shapes. In a particular embodiment, thermoplastic and thermoset polymer composite parts can be formed with a reduction in part contamination from the pressurizing medium, a reduction in cycle time and an increase in end product quality and consistency. FIGS. 2 and 3 illustrate a versatile 300-ton experimental thermo-hydroforming (THF) press that allows for rapid reconfiguration of the forming dies resulting in subtly different process that produce drastically different results.

Pourboghrat et al. U.S. Pat. No. 6,631,630 describes a thermohydroforming process and apparatus, including a 40-ton thermohydroforming press that could form 4" hemispheres and other small geometries including single- and double-taper cups. The parts were relatively small thin shapes that could only be formed at a very slow rate since the entire die (including the contained pressurized fluid) had to be brought up to the forming temperature of the composite being formed. A sheet rubber padding protective mechanism was sufficient to protect the composite blank from the hydraulic fluid that was used to transfer heat and forming pressure to the blank. The padding mechanism was clamped between the upper and lower zone die blank holding surfaces using mechanical force supplied by the hydraulic rams of the press. The upper and lower zone dies were flooded with oil and are connected to ensure that the pressure in the forming chambers is at equilibrium. The punch could be actuated independently of the upper zone die making the press double acting.

When working with thermoplastic composites, the blank suitably is first laid up and consolidated (e.g., compressed) in a heated platen press. Once the blank is consolidated and cooled, it is removed from the platen press and suitably treated so that it will be protected from the forming oil. The consolidated blank can be vacuum-sealed with a flexible film material (e.g., with an additional release coating between the blank and film). Alternatively, the blank can be protected with heat-resistant rubber pads on its top and bottom surfaces. The protected blank is then loaded into the hydroforming dies and clamped (e.g., hydrostatically as described herein). Once the blank is clamped between the upper and lower zone dies and fluid has been flooded into the upper and lower zone die chambers, heating rings are used to bring the temperature of the entire forming die (including the upper and lower zone, the contained fluid, the punch and the composite blank) up to the forming temperature. This temperature is suitably between the glass transition and meting temperature for thermoplastic resin systems and approximately at the curing temperature for thermoset resins. Once the desired temperature is achieved at the composite core, the heated fluid contained within the upper and lower zone is pressurized using a computer controlled pressure regulator system. Once the desired pressure is achieved the punch is traversed through the die, first making contact with the composite and then beyond up into the fluid chamber which is designed to allow sufficient clearance for the size of the punch plus the thickness of the composite material. The pressure can either be held constant during the traverse of the punch or set to some arbitrary function which is controlled by the aforementioned pressure regulated computer system.

As the punch traverses the die, the blank is conformed to the geometry of the punch by the heated pressurized fluid. Once the blank has been fully drawn into the fluid chamber (i.e., enough to yield the desired geometry), the heating unit is deactivated to allow the dies, the heated fluid and eventually the thermoformed part to cool, for example if a thermoplastic resin is used for the blank. If a thermoset resin is employed for the blank, then heating can be continued until sufficient time has passed to allow the composite to reach a solid state (e.g., a cured or substantially cured state). Once the composite has solidified for either case, the forming oil is drained from the upper and lower die cavities and the part can be removed.

Apparatus Description

Figure 4:
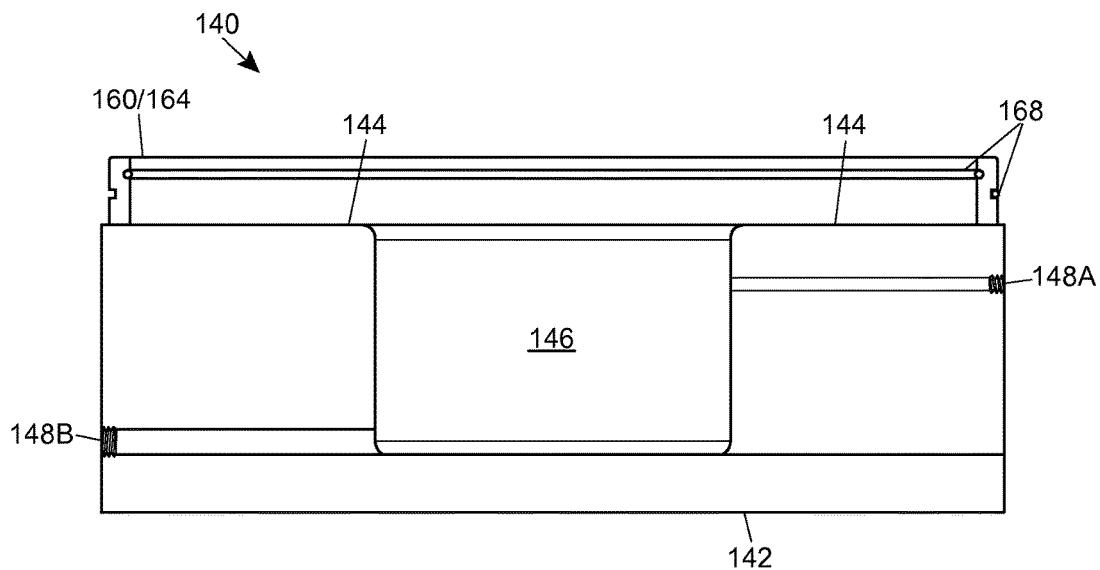
FIG. 4 illustrates a section view of the lower zone die. The fluid cavity is supplied and vented with oil from the two channels that extend to the outer periphery of the die. Two fluid containing seals can be seen inserted into the tongue of the die.
Figure 5:
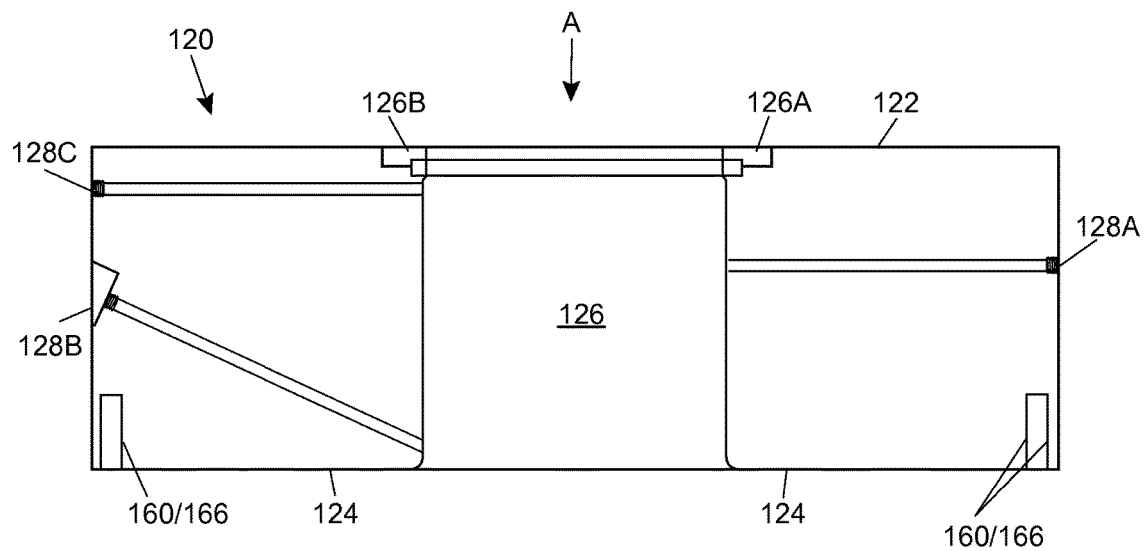
FIG. 5 illustrates features of the upper zone die including the punch cavity, clamping surface, and groove. This is a section view and is cut through the center line of the part.

The hydroforming press consists of an upper zone die and a lower zone die. The upper zone die contains a cavity that houses a punch of the desired geometry for the final formed part. This is called the punch cavity and can be seen in FIG. 6. On the bottom side of the upper zone die a flat clamping surface extends out to a groove that contains two sealing surfaces—an inner and outer sealing surface as illustrated in FIG. 5. This is called the groove. The lower zone die features a clamping surface as well that extends out to a tongue. The tongue houses seals for containing the pressurized fluid. This can be seen in FIG. 4. The sealing surfaces on the groove interface with the seals housed in the tongue. The tongue and groove fit together in a way that the gap between the upper and lower clamping surfaces is variable but allows pressurized fluid to be contained. This can be seen in FIG. 7. The lower zone die features a fluid cavity which is flooded with heated pressurized fluid, keeping the composite at its forming temperature. This can be seen in FIG. 4. Both the lower zone die and the upper zone die have the ability to independently contain and regulate heated pressurized fluid with the barrier between the upper and lower zone cavities being the composite blank.

The hydraulics of the system can be configured in several ways but it is commonly designed in view of common goals. First, it is desirable to provide the fluid cavity with heated forming fluid to keep the composite at the appropriate forming or curing temperature. It is preferred but not necessary to have a heating system that can inject heated and/or pressurized fluid into the fluid cavity. It is also desirable to be able to supply the forming cavity with cool pressurized forming fluid. The cool fluid is at a temperature sufficient to bring the temperature of the blank below its glass transition temperature or forming temperature (e.g., when the matrix is of thermoplastic composition). It is also desirable to control the pressure of the incoming hot and cold fluid with the use of a controlled pressure regulation system. Typically pressure is raised with a pump and supplied at a desired value with a regulator that can be computer controlled. There also can be a pressure regulation system at the outlet of the fluid chamber that can be controlled independently of the regulator that supplies pressurized fluid to the fluid chamber. This allows fluid to be circulated under pressure, which facilitates cooling or heating of a formed part when it is in a malleable state. Extra valves, regulators and pilots can be added to system as desired. An illustrative embodiment of this design is provided in FIG. 1.

Process Description

Many of the composite materials formed with this system utilize thermoplastic resin systems. The composite blank can be a laminated structure and is consolidated into a flat sheet. One possible way to do this is using a heated platen press. Composites of different make-ups can also be used with this process. Once the blank is consolidated and cooled, it is removed from the heated platen press and can be stored for an extended period of time until it is formed. Prior to forming, the composite is laid up inside of a bagging system referred to as the blank sandwich. The blank sandwich consists of nylon vacuum bagging film with a layer of release film between the bagging film and the pre-consolidated composite. The blank sandwich can use other release agents effectively. The blank sandwich can be viewed in FIG. 8. The nylon bagging film is sealed against itself using a tacky vacuum bagging tape which is usually used for vacuum forming composite parts. A vacuum is pulled within the blank sandwich to smooth any wrinkles on the outer surfaces on the flat surfaces of the blank. The blank can then be heated to its forming temperature while inside of the bagging system by any number of methods (e.g., using infrared (IR) or other heaters). Unconsolidated composites can be laid up and consolidated while within the blank sandwich if the consolidation temperature does not exceed the service temperature of the bagging film.

Figure 10:
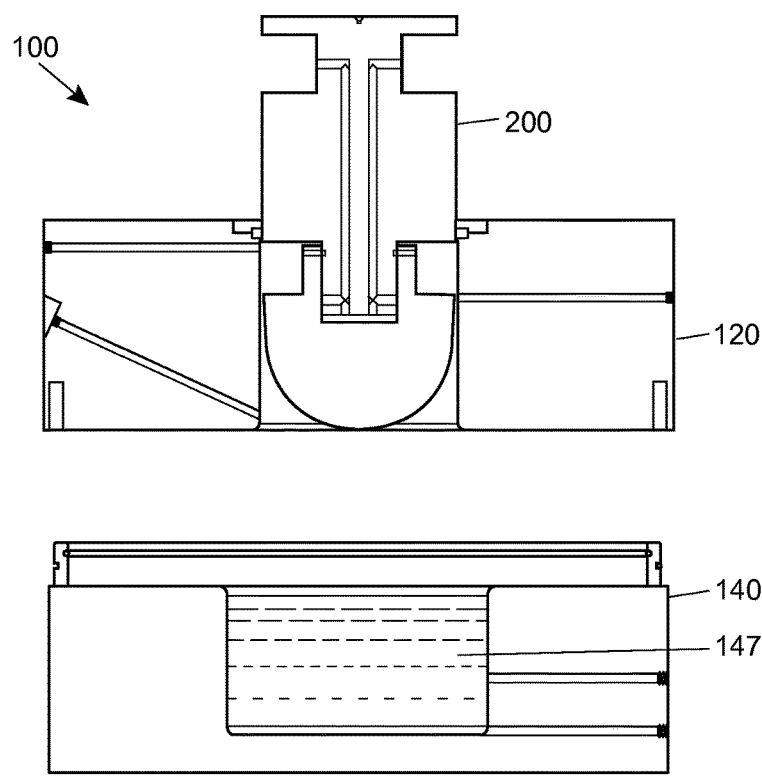
FIG. 10 illustrates step two of a representative forming process. As the blank sandwich approaches the desired temperature, the fluid cavity is flooded with forming oil to maintain the blank at the correct temperature. Oil is filled until the fluid level is flush with the lower zone clamping surface. This is preferably completed immediately prior to the next step as the oil will cool quickly.
Figure 11:
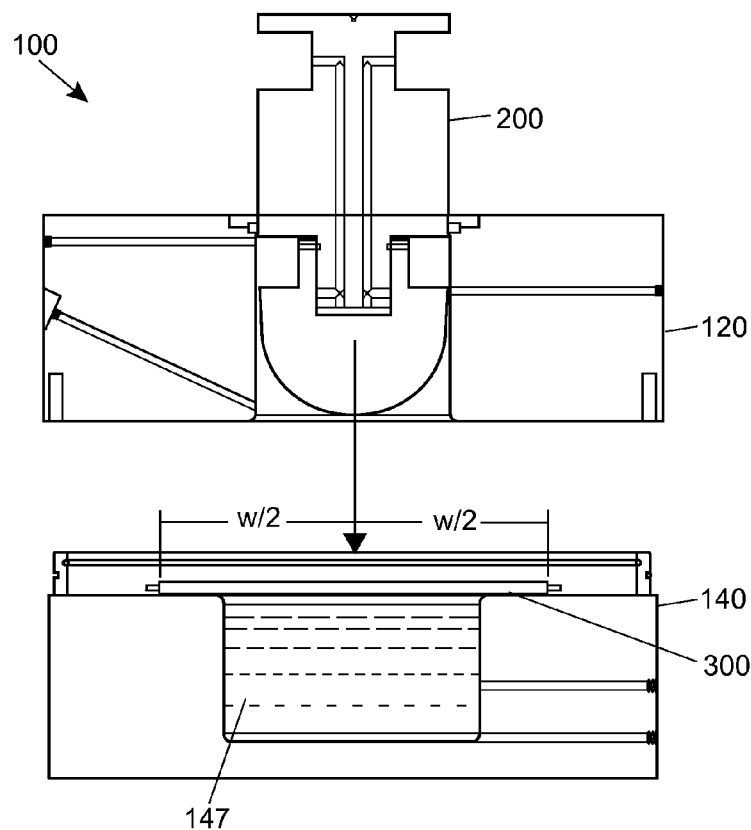
FIG. 11 illustrates step three of a representative forming process. The heated blank sandwich is placed on the lower zone clamping surface and is aligned with the punch. Proper initial alignment of the blank is important, as an improperly aligned blank likely will not draw in symmetrically and could cause a part of unacceptable quality to be formed. Since the blank will be contacting metal (e.g., steel) die and punch surfaces, it is preferred that these surfaces be heated in order to maintain the proper blank temperature (e.g., decreasing process time and reducing thermal gradient in the blank). Heating of these surfaces will also keep the heated oil at the correct temperature.
Figure 12:
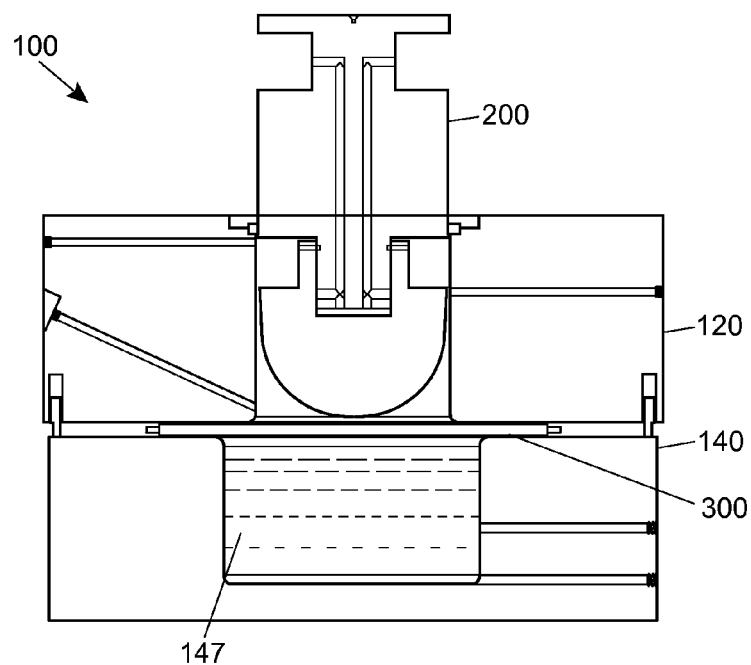
FIG. 12 illustrates step four of a representative forming process. The blank sandwich is clamped under a light load (~20 kip) and low pressure is built in the fluid cavity (~100 psi). It is preferable to be able to build pressure with heated oil but it is not necessary. The blank is brought to approximately 0.01" above the plane made by the upper zone clamping surface to support the blank as is will be bulged upward by the fluid pressure.
Figure 13:
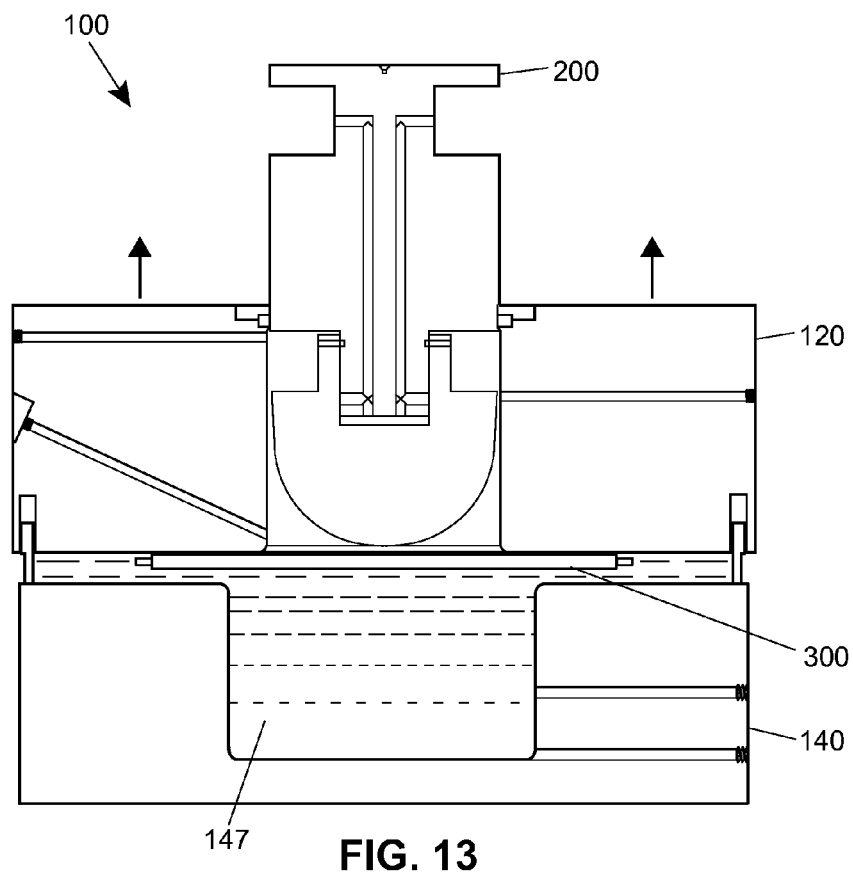
FIG. 13 illustrates step five of a representative forming process. The upper zone die is slowly lifted upwards (e.g., about 0.01"). This allows fluid to leak out into the side interfacial clamping cavity while still keeping the blank sandwich clamped to the surface of the upper zone clamping surface. The blank sandwich is held in place by pressurized fluid on the bottom of the blank which pushes the blank tightly against the upper zone die clamping surface. This is called hydrostatic clamping. For this to work, fluid cannot get between the upper die clamping surface and the blank sandwich. This is why having a flat surface is important when preparing the blank sandwich. The force exerted by the fluid also generates traction against the clamping surface, resisting forces that would otherwise cause the blank to slide. While hydrostatically clamping, the fluid is contained in a pressure vessel that consists of the fluid forming cavity, the upper and lower zone die clamping surfaces, the tongue and groove and the blank itself.

As the blank is heating, the lower zone fluid cavity is flooded with hot oil from the oil heater. This can be seen in FIG. 10 (illustrated as oil or other fluid 147). The temperature of this oil is selected to keep the composite at the appropriate forming temperature. It is preferable to heat the upper clamping surface, lower clamping surface and punch as well in order to maintain the temperature of the blank sandwich (FIG. 11 & FIG. 12). It is also preferred to flood the cavity with a small amount of hot oil in order to maintain blank temperature. Once the blank sandwich has been raised to the appropriate forming temperature, it is laid flat on the lower zone die clamping surface (FIG. 11). In this step, it is important to properly align the blank sandwich with the punch so that the part forms properly. Next, the upper zone die is lowered onto the blank until a light clamping force is generated to firmly grip the blank sandwich between the upper zone and lower zone die clamping surfaces. This clamping load can be applied by either position controlling the upper zone die to a desired position or requesting the press to seek a desired load to be applied to the blank sandwich. The punch is also brought down simultaneously until it is very close (e.g., about 0.01" or less) to the blank surface. This step can be seen in FIG. 12. Depending on the thickness of the composite sheet, a relatively low pressure (e.g., about 10-100 psi) is built in the fluid cavity. Pressure is built using cool oil from the pressure producing skid (PPS). It is preferable to build pressure using hot fluid from the heater. However, that is not necessary as the volume of the fluid required to raise the pressure of the fluid cavity is small compared to the total volume of fluid in the fluid cavity. Therefore, using the cooler fluid does not have a significant effect on the temperature of the oil contained in the fluid cavity. Once the pressure is raised, the upper zone is slowly raised up about 0.01" to keep the blank hydrostatically clamped to the upper zone clamping surface. When hydrostatically clamped, the blank will no longer physically contact the lower zone die. This is an important difference between the disclosed process that described in U.S. Pat. No. 6,631,630. Fluid pressure acts against the blank, keeping it clamped to the upper zone clamping surface (FIG. 13). This clamping style is referenced as hydrostatic clamping.

Figure 14:
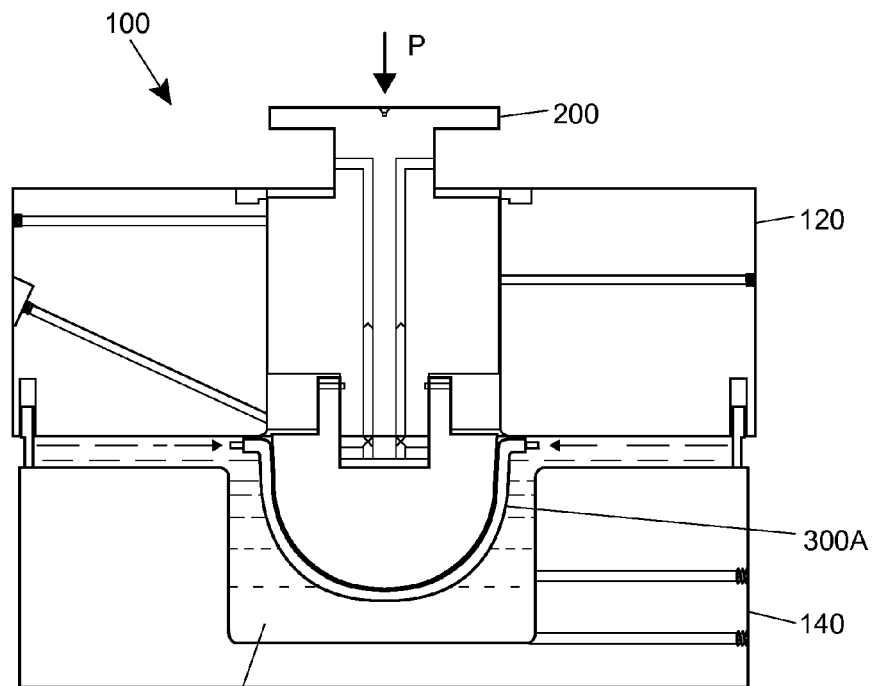
FIG. 14 illustrates step six of a representative forming process. The punch is drawn down through the blank and into the forming fluid cavity. As the punch travels down, the blank sandwich conforms to the punch due to the unbalanced forces on the surfaces of the blank. The punch traveling downward causes a decrease in the volume of the pressure vessel described above. This decrease in volume results in an increase in pressure. Use of computer controlled pressure regulators can vent off excess fluid in order to conform to a desired pressure profile. The blank sandwich will be drawn across the upper zone die clamping surface as the punch is traversed due to the material's resistance to in-plane elongation. This drawing in of the blank is heavily influenced by the blank's position on the clamping surface and suitably is carefully regulated. Once the punch is fully traversed the fluid chamber is held at high pressure and cool oil is circulated to reduce the temperature of a thermoplastic polymer composite formed blank until it has solidified. If a thermoset resin is being used for the blank material, then it is preferable to circulate hot oil to accelerate the post-forming curing process. The use of die and punch heating/cooling can also be used solidify/cure the composite.
Figure 17:
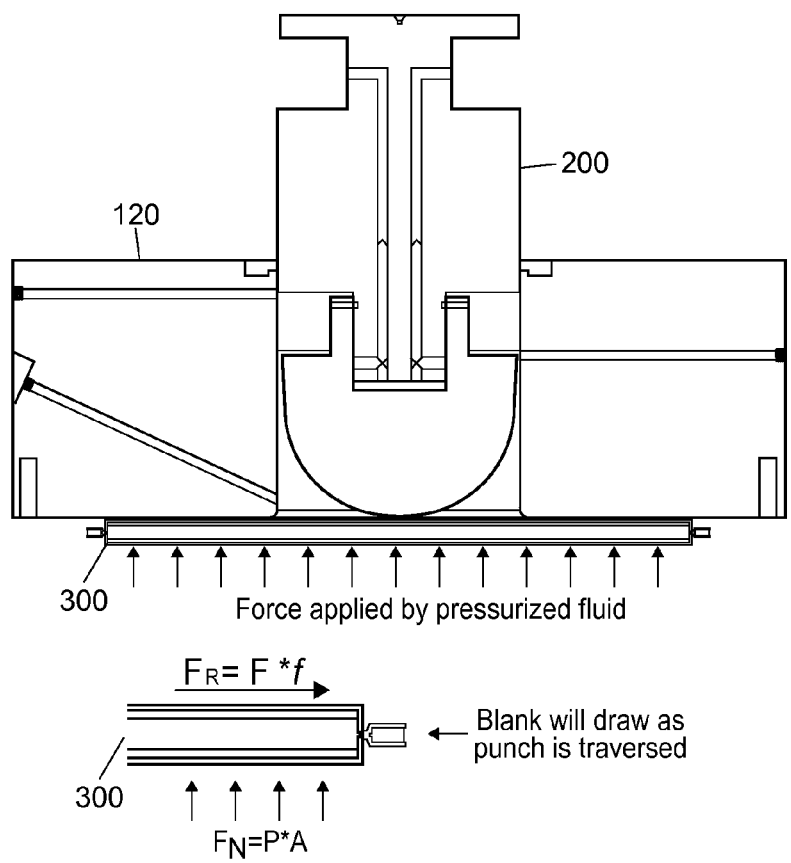
FIG. 17 illustrates the forces exerted by the pressurized fluid when hydrostatic clamping is being used. The pressure on the lower surface of the blank sandwich generates a distributed normal force across the surface of the blank sandwich. This tightly presses the sandwich against the upper zone die clamping surface, holding it there. As the punch is drawn through the material the blank sandwich will be drawn across the clamping surface. The normal forces generate frictional forces which resist this drawing motion across the clamping surface. If the frictional force is substantially unbalanced on opposite sides of the blank then the part may not draw in evenly producing undesired results.

When hydro-static clamping is being initiated, a portion of the blank is not supported by either the clamping surface or the punch. This section of the blank will bulge into the gap between the side wall of the punch cavity and the punch itself. Care must be taken to reduce the size of this gap during die design. Otherwise, the blank may be completely bulged into the fluid cavity preventing pressure from being built. After the hydrostatic clamping has been accomplished, the punch is traversed down into the blank sandwich and eventually into the lower zone fluid forming cavity (FIG. 14). As the punch is drawn into the lower zone, the blank conforms to the punch and is drawn across the upper zone clamping surface. Concurrent to this phenomenon, the volume of the fluid cavity is reduced leading to an increase in pressure. As the pressure increases and the blank draws across the clamping surface, the initial positioning of the blank becomes increasingly important. If the blank is off center before it is clamped then a discrepancy in contact area will exist when hydrostatic clamping is initiated (FIG. 17). The side of the blank that engages more clamping surface will draw in less due to a higher frictional force holding this section of the blank in place. This is why proper indexing of the blank to the punch and clamping surface before clamping is important. Having a clean smooth surface on the blank sandwich also helps ensure even draw in of the blank.

Figure 15:
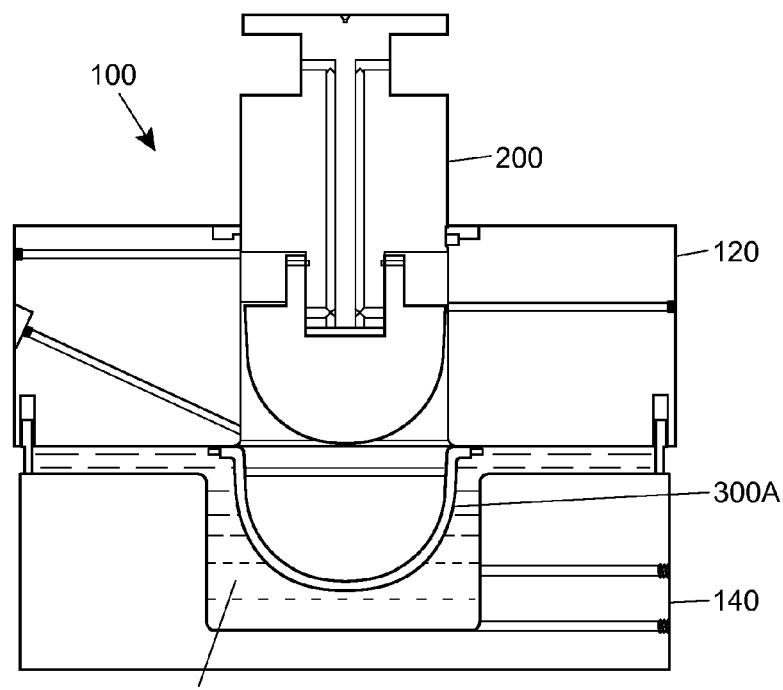
FIG. 15 illustrates step seven of a representative forming process. Once the part is solid, pressure can be reduced to ambient in the fluid cavity. The punch is traversed upwards to free the part from the punch in case they are stuck together.
Figure 16:
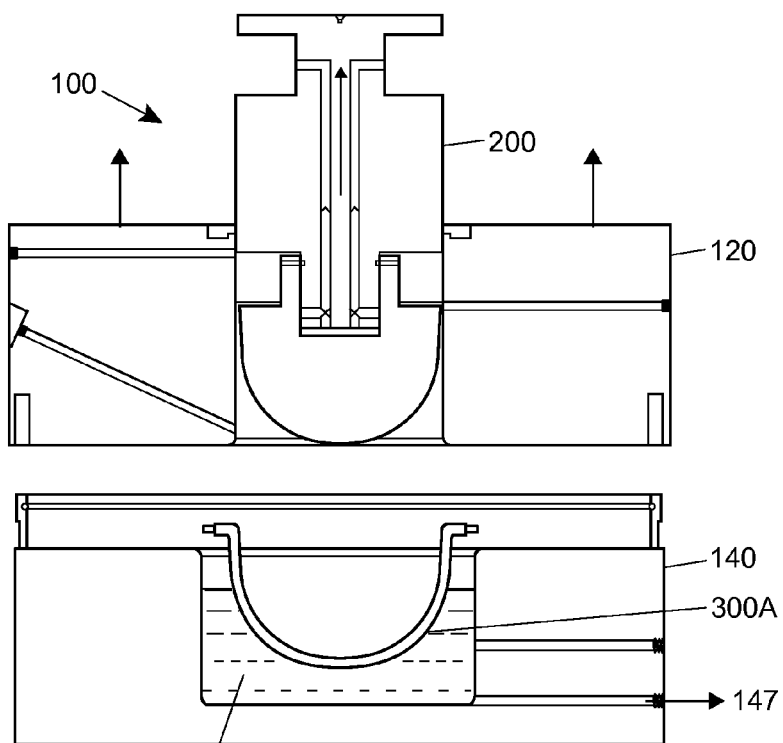
FIG. 16 illustrates step eight of a representative forming process. The punch and upper zone die are traversed upwards and the blank sandwich is recovered. The part can then be removed from the bladder/bagging system. The oil can then be pumped out of the fluid cavity and returned to the fluid reservoir.

As the punch is drawn through the composite material and into the fluid cavity, the rate of pressure increase can follow a predetermined profile. This profile can be implemented by a computer-controlled hydraulic relief regulator downstream of the forming die. Once the punch has reached its fully traversed position, cool hydraulic oil can be circulated through the forming cavity, for example to bring a formed thermoplastic composite to a temperature where the thermoplastic is solid. This is accomplished by lowering the desired pressure at the pressure reducing regulator. This regulator vents hot oil as cool oil is introduced to the system from the PPS. In the event that a composite uses a thermoset resin system, hot oil can be circulated through the die to accelerate the curing process. Either way, once the part has solidified, pressure from the lower zone can be relieved and the upper zone die and the punch can be traversed upward so that the finished part can be recovered and removed from the bladder system (FIG. 15 and FIG. 16).

Figure 1:
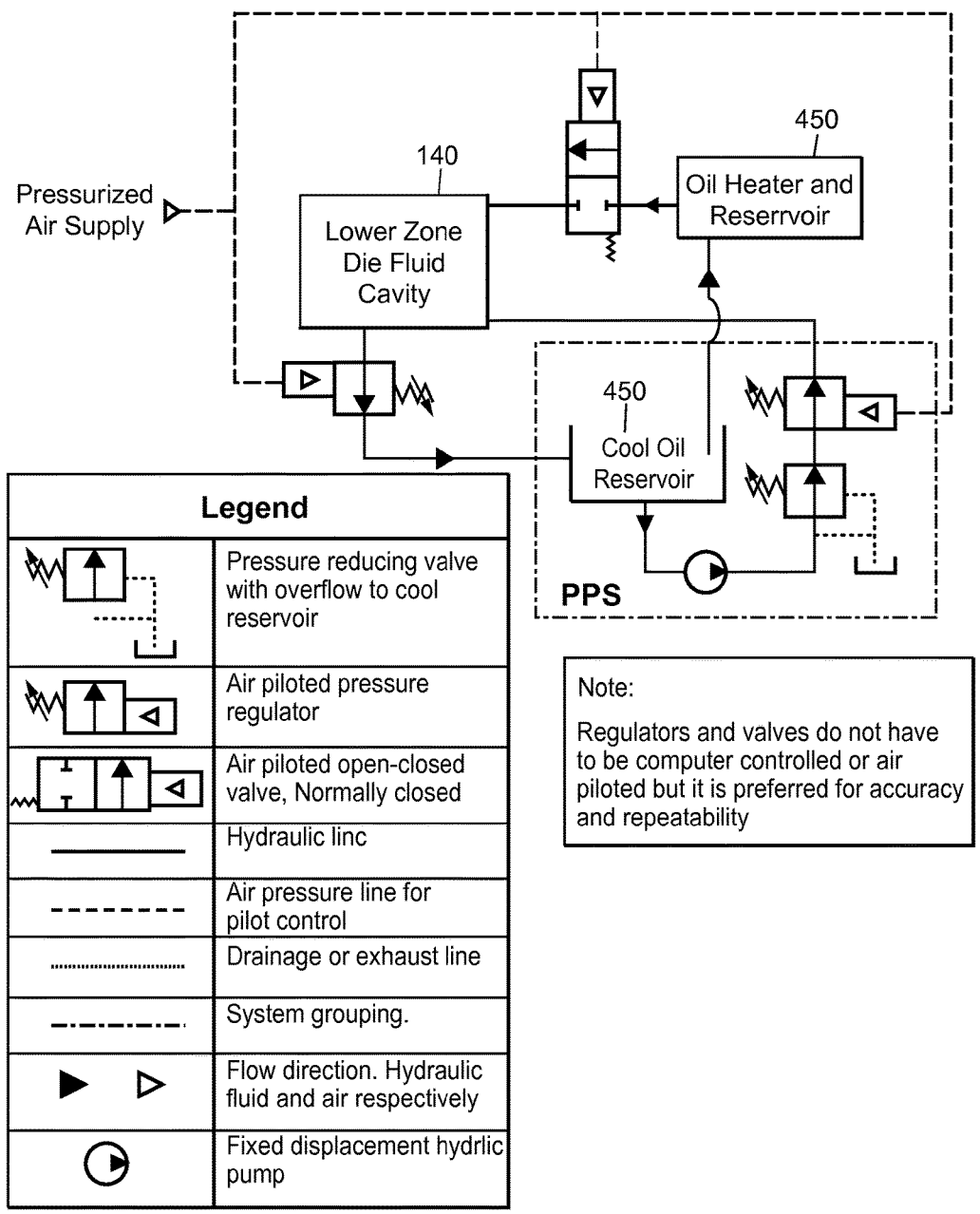
FIG. 1 is a schematic of basic hydraulic system that provides hot and cold pressurized oil to the lower zone die fluid cavity. Air piloted pressure regulators and the oil heater are preferably computer controlled. Additional loops can be added to the pressure producing skid (PPS) in order to provide pressurized fluid to the upper zone cavity independent of the lower zone fluid cavity. This is an illustrative arrangement to supply hot and cold pressurized forming oil, and it can be modified to achieve similar results as desired.

A passage for oil recovery is added to the lower zone which allows the hydraulic fluid to be returned to the oil reservoir. By integrating the plumbing with a cooling loop pump on the PPS, valves can be actuated that allow oil to be pumped at a high rate from the fluid cavity of the lower zone to the oil reservoir. An optional overflow passage from the reservoir can return excess oil back to the heater reservoir. This option completes an oil cycle that eliminates the need to manually transfer oil from the heater reservoir to the PPS (FIG. 1).

Figure 18:
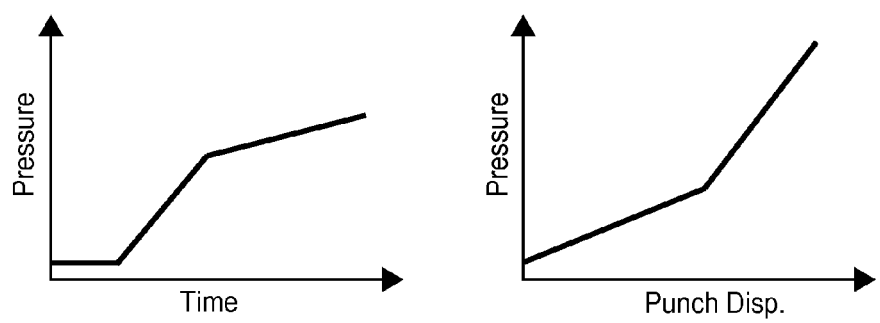
FIG. 18 illustrates an example of two different styles of pressure profiles that may be desired as the punch is drawn through the blank (e.g., polymer composite or otherwise). Generally an increase in pressure is desired to form the material to the punch as the punch is drawing downward. A pressure increase occurs naturally due to the punch reducing the volume of the pressure chamber as it deforms the compliant blank. This pressure increase can be tailored by a pressure-reducing regulator that is computer controlled. A desired pressure profile based on either time or punch displacement can be fed to the computer and a feedback controller will seek the desire pressure profile. The profile on the left is a desired pressure profile that is a function of time while the one on the right is a function of punch displacement.

Fluid passages can also be implemented in both the upper and lower zone that allow different applications of the fluid pressure. The above process description relies exclusively on pressurized fluid being built in the lower fluid cavity. Use of quick disconnects or other plumbing features allow the lower zone fluid cavity to be directly connected to the upper zone punch cavity. This allows fluid pressure to be exerted equally on the top and bottom of the blank sandwich in some embodiments. In other embodiments, a differential pressure is exerted between the top and bottom blank surfaces (e.g., higher pressure in the lower fluid forming cavity and interfacial clamping cavity, and lower (or ambient) pressure in the punch cavity). In order to flood the upper zone punch cavity with oil air must be allowed to escape. This is accomplished by implementing an air bleeding port (FIG. 5). Further still, individual pressure regulation systems can be implemented so that separate pressure profiles can be implemented in the lower zone fluid cavity and the upper zone punch cavity. The use of the term pressure profile can have dual meanings in that the fluid pressure can be specified as a function of either time or punch displacement (FIG. 18).

Additional Features

The hydroforming press and process can include several additional features and process modifications to increase the ease of manufacturing. For example, the lower zone die clamping surface may include or otherwise be in the form of a retractable clamping mechanism that eliminates the need to raise the upper zone in order to initiate hydrostatic clamping. An example of this can be seen in FIG. 19. The need to drop away the clamping surface is a product of having the punch traverse downward and having the fluid cavity below the part. In another embodiment, the hydroforming press is configured opposite from the illustrated press in that the fluid cavity is located above the composite blank and the punch is housed below the composite blank (i.e., punch is drawn upwards instead of downwards). This configuration allows for easier hydrostatic clamping as gravity does not need to be taken into account before hydro-static clamping is initiated. Either configuration is acceptable and has been shown to produce quality results.

Figure 20:
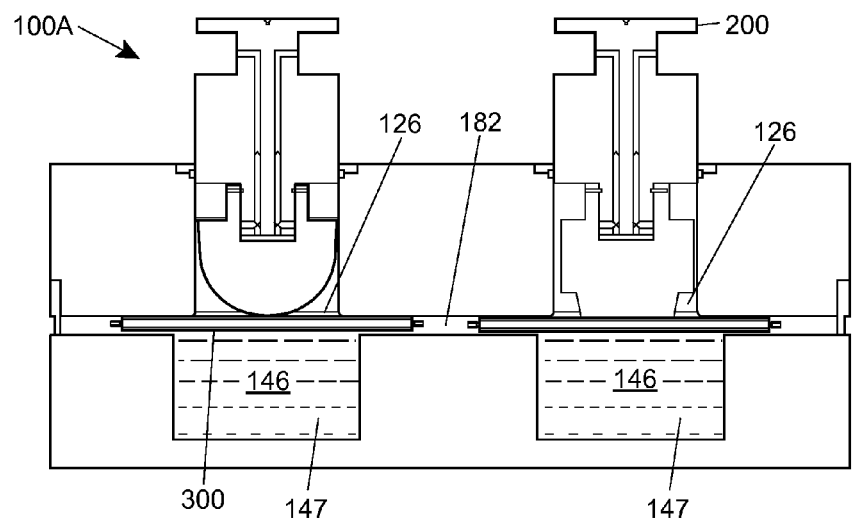
FIG. 20 illustrates hydroforming dies configured to form several parts at once. This figure shows two separate blanks immediately before the punches are drawn through the material. Since the fluid cavity is continuous, the fluid pressure will be the same for all pieces being formed. Parts of differing geometry can be formed simultaneously as can be seen in the figure. This method can substantially increase output if large tonnage presses are available (e.g., where a larger pressurized area requires correspondingly more holding force).
Figure 21:
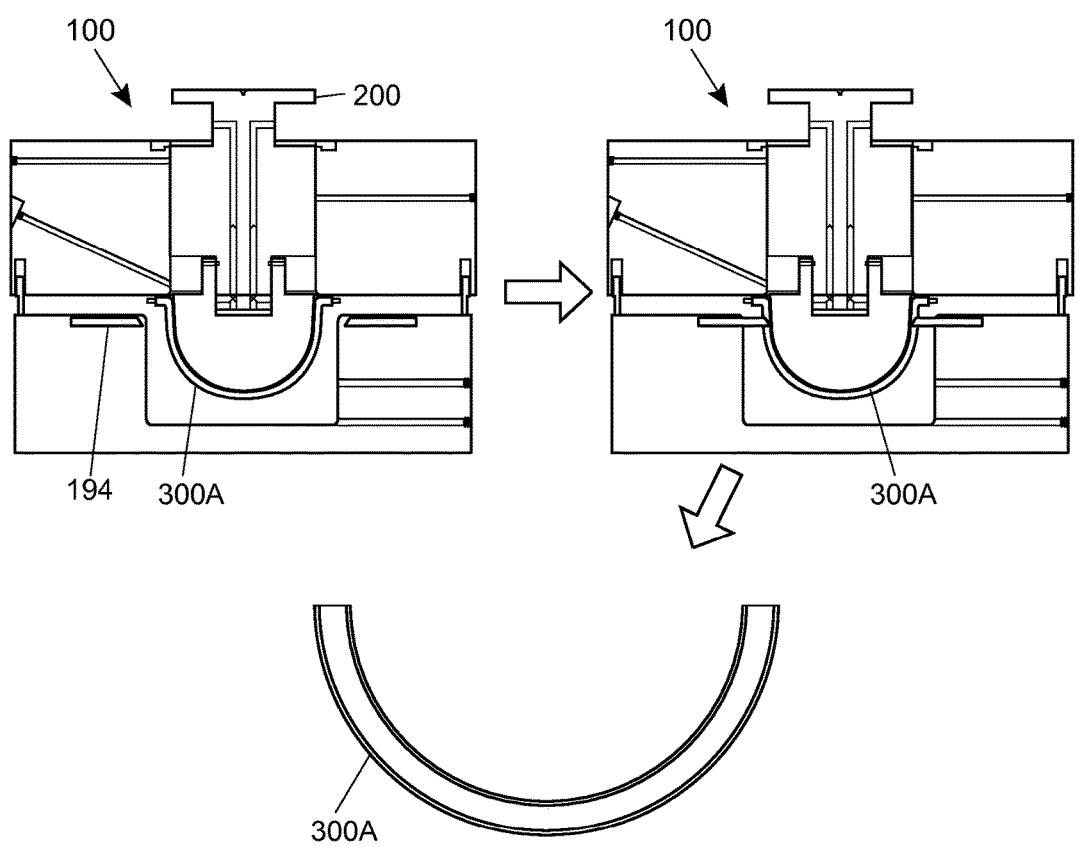
FIG. 21 illustrates one way to incorporate a trimming mechanism into the hydroforming press. After the part has been formed and solidified, shears can close around the part and trim away excess material. This figure shows only one way in which trimming can be accomplished within the press. Other options include shears that extend vertically instead of horizontally, water jetting, computer controlled ultrasonic blade, hot blade and other common cutting methods. It is preferable to not let the part contact the forming fluid while trimming is being performed.
Figure 22:
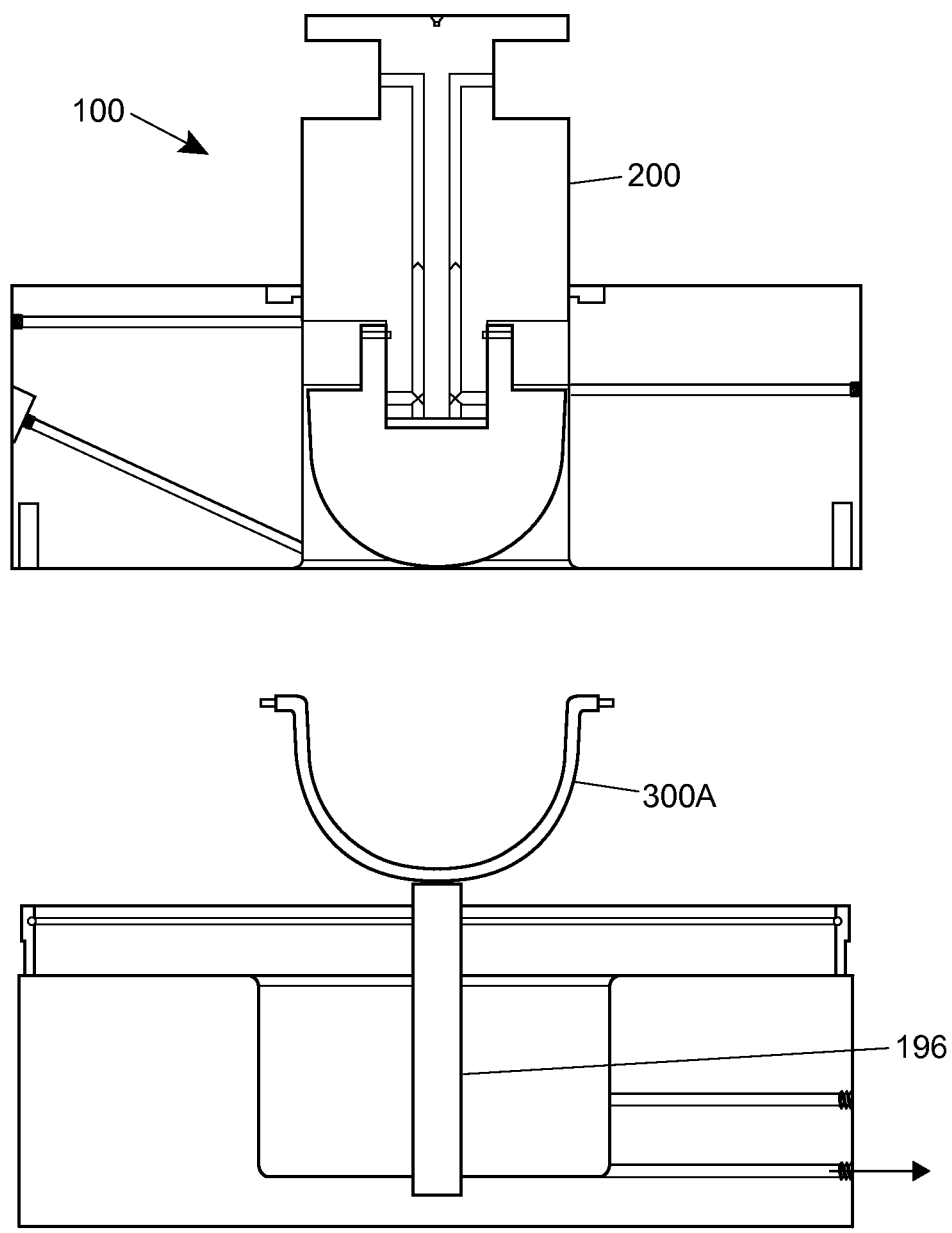
FIG. 22 illustrates the formed and solidified final part being raised out of the forming cavity by a retractable column. In the case of deep drawn and/or large and heavy parts, retrieval either by laborers or automated machinery can be difficult. By raising the formed part to a location where it is more accessible, less effort is required during the removal of the part from the press.

Since the fluid chamber of the lower zone is a single contained pressure vessel, it can be used to form several parts of varying geometry simultaneously. An example of this can be seen in FIG. 20. The lower zone can also be fitted with tooling that can trim excess composite from the final part before the piece is removed from the press. This is seen in FIG. 21. A mechanism can be employed to remove the formed blank from the press as well so that a recovery of formed pieces is simplified. This is shown in FIG. 22.

Figure 23:
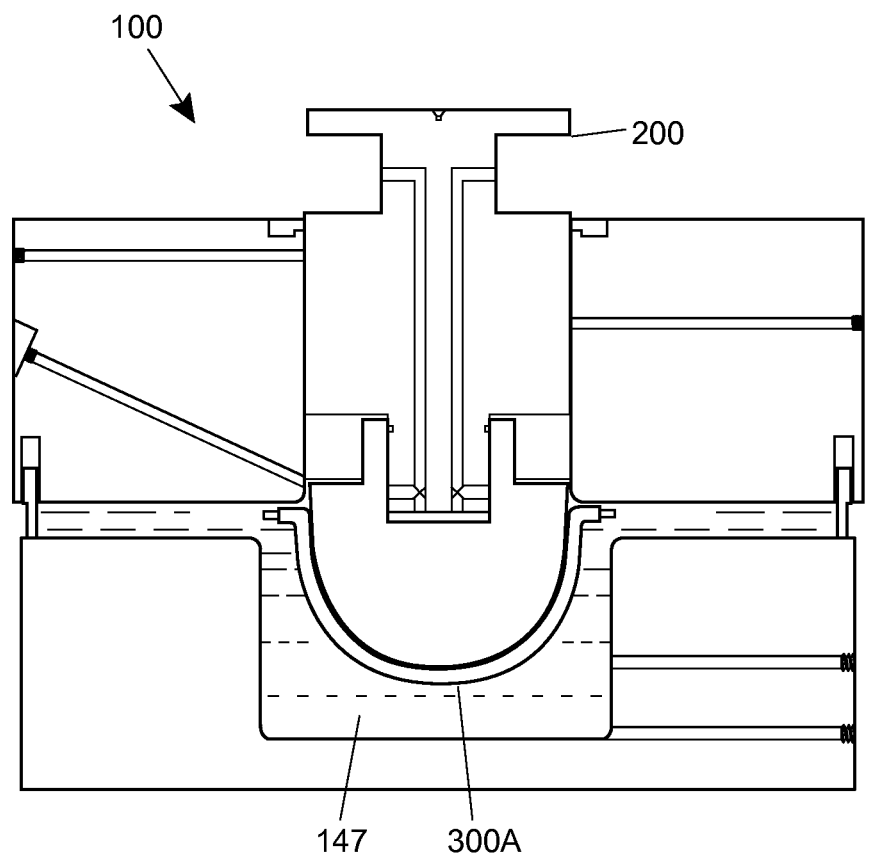
FIG. 23 illustrates a method in which the part being formed is exposed to a coating agent. In this embodiment, the bladder/bagging system for the blank can be omitted to reduce waste material and minimize time require to prepare the blank for forming. A liquid coating solution is used as the forming fluid and is compatible with the blank material (e.g., polymer composite) in such a way that as the coating and composite make contact, the coating cures into a hard shell. This allows the remained of the forming fluid/coating solution to remain in a liquid state that can be used as a means to provide forming pressure and heat to keep the blank at the appropriate forming temperature. This method performs two tasks at once; forming the blank and applying a protective coating, all while reducing process time and disposables.
Figure 23:
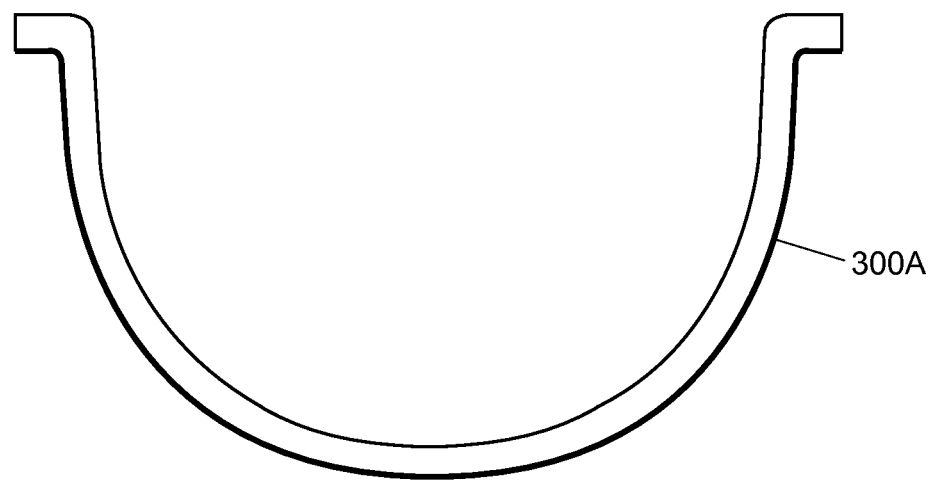

Depending on the function of the part, it may be desirable to apply a coating to the exterior of the final piece. It is possible that a coating agent can be flooded in the fluid cavity of the lower zone and can come into direct contact with the composite being formed. For example, the forming fluid can include any of the various natural or synthetic oils in combination with the coating agent, or the forming fluid can include the coating agent without such oils. In some embodiments, the part can be formed using the natural or synthetic oils as a forming fluid without the coating agent, and then the coating agent can be introduced into the die to contact and coat the formed part afterwards. In various embodiments, the coating agent can include a thermoplastic resin (e.g., in liquid form, such as above its melting temperature) or a thermoset resin (e.g., in liquid form, such as in an uncured or incompletely cured state). If the bladder system of the blank sandwich is omitted, then the surface of the blank (e.g., composite, metal, or otherwise) and corresponding formed part can be coated and/or impregnated with the coating agent. The coating agent and the blank material (e.g., composite constituents, metal constituents, etc.) can be selected accordingly such that functionalized chemical bonds form between the coating agent and the formed part (e.g., composite surface) and the coating agent solidifies shortly after they make contact. Additionally, the coating agent can soak into the blank material, resulting in a coating-impregnated formed part (e.g., a thermoplastic or thermoset resin absorbed completely or at least partially into a composite material, with or without chemical bonding between the resin and blank material). In some embodiments, the coating agent is pressurized and heated, and then it acts as the forming fluid as described in previous embodiments. By employing this option, a part with a hard coating can be produced at the same time when forming is taking place. This is seen in FIG. 23. The coating suitably remains in a liquid state while it is heated and pressurized so that it will not foul the hydraulic equipment. Solidification of the coating agent preferably occurs where the coating solution makes contact with the composite, for example while in the punch die or after the formed part has been removed from the punch die (e.g., an impregnated thermoplastic resin which cools and solidifies after forming; an impregnated thermoset resin which cures and solidifies after forming, such as with additional post-forming heating).

Pourboghrat et al. U.S. Pat. No. 6,631,630 is attached hereto as Appendix A, and a slide presentation by the inventors illustrating apparatus according to the disclosure and thermohydroformed parts manufactured with the same is attached hereto as Appendix B. Both documents are incorporated herein by reference in their entireties.

Various aspects and refinements of the disclosure are described below.

In one aspect, with particular reference to FIGS. 4-7, the disclosure relates to a punch die 100 including: (a) an upper die 120 having a top surface 122 and a lower clamping surface 124 opposing the top surface 122, the upper die 120 including or defining a punch cavity 126 extending through the upper die 120 (e.g., from the top surface 122 to the lower clamping surface 124), the punch cavity 126 being adapted to receive a punch 200; and (b) a lower die 140 having a bottom surface 142 and an upper clamping surface 144 opposing the bottom surface 142, the lower die 140 including or defining a (fluid) forming cavity 146 extending into the lower die 140 through the upper clamping surface 144 and being bounded below (e.g., by the bottom surface 142), the forming cavity 146 being adapted to receive a punch 200 extending completely through the punch cavity 126 and at least partially into the forming cavity 146. At least one of the upper die 120 and the lower die 140 include a means 160 for moveably connecting and circumferentially sealing (e.g., the dies 120, 140 are adapted to be moveably connected in a sealed configuration) the upper die 120 and the lower die 140 at an interfacial region 180 between the lower clamping surface 124 and the upper clamping surface 144 such that, when the upper die 120 and the lower die 140 are moveably connected and circumferentially sealed: (i) the upper die 120 and the lower die 140 together create or define a variable-volume interfacial clamping cavity 182 between the lower clamping surface 124 and the upper clamping surface 144, (ii) the interfacial clamping cavity 182 is in fluid communication with the punch cavity 126 and the forming cavity 146 (e.g., in the absence of other internal blocking structures such as a blank 300 or a punch 200; with a hydrostatically clamped blank 300 present, the forming cavity 146 and the interfacial clamping cavity 182 are in fluid communication with each other but not the punch cavity 126), and (iii) the upper die 120 and the lower die 140 are moveable relative to each other to vary the interfacial clamping cavity 182 volume while maintaining a circumferential seal 162 between the lower clamping surface 124 and the upper clamping surface 144.

Figure 6:
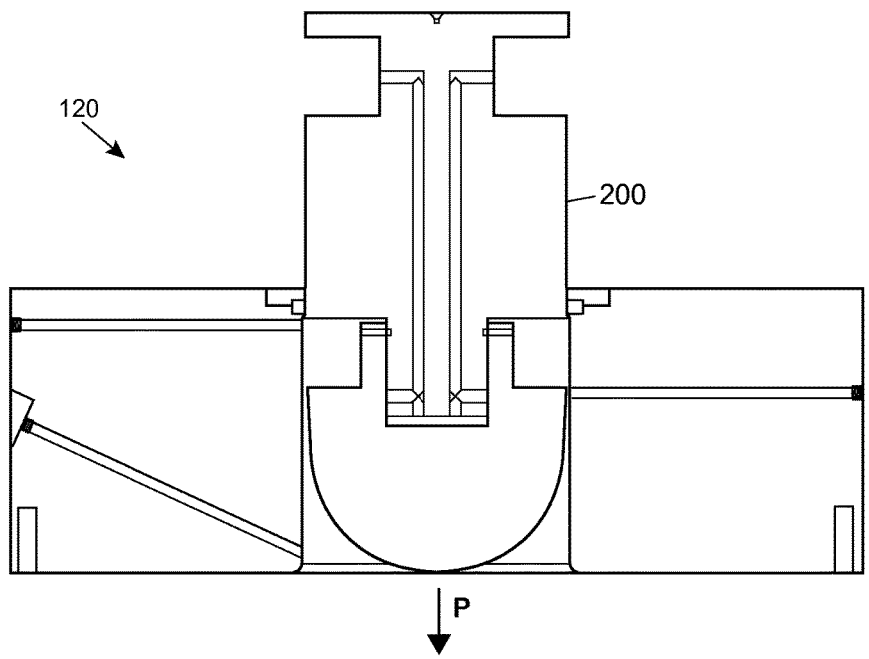
FIG. 6 is a section view of the upper zone die with the punch housed within the punch cavity shown. The punch-ram adapter serves two purposes. First, it connects the punch directly to the hydraulic ram. Second, the outer barrel of the adapter serves as a sealing surface allowing pressurized fluid to be contained within the upper zone die cavity if desired.

In a refinement, the punch cavity 126 defines an axial direction A corresponding to a direction of travel P of a punch 200 extending into or through the punch cavity 126 (FIGS. 5-6). For example, the punch cavity 126 suitably has a uniform cross section in the axial direction A, which generally corresponds to the cross sectional area of the punch 200 as it extends or retracts in the axial direction A along its punch direction P. As shown in FIGS. 5-6, the punch 200 travels in direction P (which is the same as axis A) when extended to form a part. Conversely, the punch 200 travels in an opposite direction (−P, which is aligned with axis A) when retracting after part formation. As shown in FIG. 5, the punch 200 can include optional tool coolant channels for circulating a cooling fluid during use to maintain a desired punch 200 temperature. As further shown in FIG. 5, the seal 126A contacts the punch 200, thus allowing pressurized fluid containment in the cavity 126. Similarly as shown in FIG. 6, the seals 168 allow pressurized fluid containment in the clamping cavity 182 when the seals 168 are engaged in the groove 166.

Figure 7:
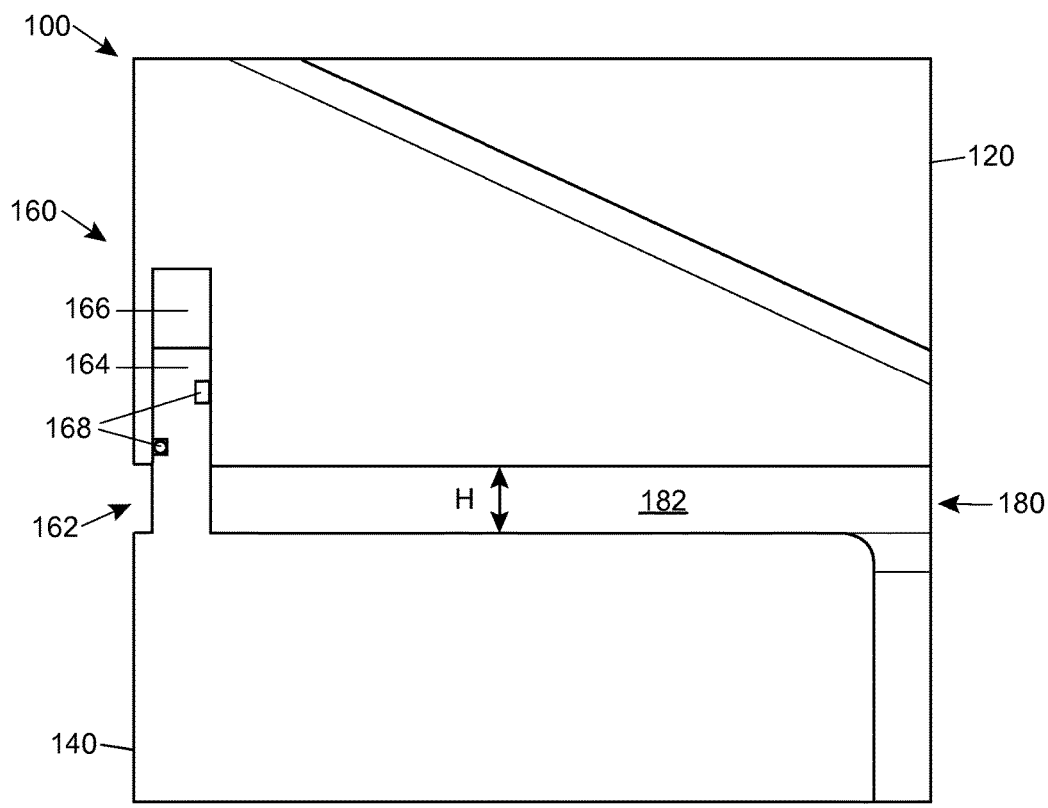
FIG. 7 illustrates the tongue from the lower zone die mating with the groove from the upper zone die. Seals on both sides of the tongue contact the sealing surfaces of the groove and form a seal capable of housing high pressure and temperature fluid. The gap between the sealing surfaces is variable as long as the seals engage the sealing surfaces. This allows variable blank thicknesses to be used with a single set of tooling (i.e., generally corresponding to the depth of the groove, the height of the tongue, and the vertical location(s) of the seal(s), which related to the maximum gap height that still provides a sealed interfacial cavity for hydrostatic clamping).

The interfacial clamping cavity 182 generally extends in a radial direction (or more generally in a direction perpendicular to the axial direction A of the punch cavity 126 or direction of travel P of the punch 200) to a greater extent than the punch cavity 126 and the forming cavity 146. This design allows the use of a hydrostatic clamping technique to maintain the blank 300 in contact with the upper die 120 during hydroforming (FIG. 14). The design also allows hot, pressurized hydroforming fluid from the lower die cavity 146 to enter the interfacial area 182 during hydroforming (FIGS. 14-16 and 20), thus providing a uniform pressure on the blank 300 surfaces and permitting multi-chamber die design. The design also provides a circumferentially sealed interfacial area 182 that prevents hydroforming fluid leakage during use (FIG. 7). The design also allows the interfacial clamping cavity 182 to accommodate an initially undeformed (e.g., flat or otherwise sheet-shaped) blank 300, and it allows forming fluid to travel between cavities in a multi-cavity/multi-punch die 100A (e.g., having 2 or more punch cavities and 2 or more corresponding forming cavities).

The upper die 120 and the lower die 140 can be moveable or slidable in the axial direction A to vary the axial gap height/spacing H between the two clamping surfaces 124, 144 while maintaining the outer circumferential seal 162 between the upper and lower dies 120, 140 during movement and while engaged, thus preventing leakage of forming fluid radially outward. When the punch 200 is also present in the punch cavity 126, the entire punch die 100 internal volume (e.g., punch cavity 126, interfacial clamping cavity 182, and forming cavity 146 collectively) is sealed from the punch die 100 external environment. In various embodiments, the upper die 120 can be moveable while the lower die 140 has a fixed position, vice versa, or both dies 120, 140 can be independently moveable. The dies 120, 140 can be formed (e.g., machined from metal) from any suitable material with sufficient strength and hardness to withstand common forming pressures and forces, for example including various metals such as steel (e.g., tool steel), aluminum, etc.

In various refinements, the means 160 for moveably connecting and circumferentially sealing the upper die and the lower die can include complementary tongue-in-groove mating structure on the two dies 120, 140. In an embodiment (FIGS. 4-7), (i) the upper die 120 defines a groove cavity 166 having an open area at the lower clamping surface 124 circumferentially enclosing the punch cavity 126 at the lower clamping surface 124; (ii) the lower die 140 further includes a tongue 164 extending outwardly (e.g., upwardly as shown) from the upper clamping surface 144 and circumferentially enclosing the forming cavity 146 at the upper clamping surface 144; and (iii) the groove 166 and the tongue 164 have shapes adapted to mate to each other and form the circumferential seal 162 between the lower clamping surface 124 and the upper clamping surface 144 when the upper die 120 and the lower die 140 are moveably connected. In another embodiment (not shown, but analogous to FIGS. 4-7), (i) the lower die 140 defines a groove cavity 166 having an open area at the upper clamping surface 144 circumferentially enclosing the forming cavity 146 at the upper clamping surface 144; (ii) the upper die 120 further includes a tongue 164 extending outwardly (e.g., down) from the lower clamping surface 124 and circumferentially enclosing the punch cavity 126 at the lower clamping surface 124; and (iii) the groove 166 and the tongue 164 have shapes adapted to mate to each other and form the circumferential seal 162 between the lower clamping surface 124 and the upper clamping surface 144 when the upper die 120 and the lower die 140 are moveably connected. A circumferential enclosure indicates that the groove 166 or tongue 164 completely surrounds the perimeter of the internal cavity 126 or 146 of its die 100 portion, thereby allowing the upper and lower dies 120, 140 to provide the circumferential seal 162 between the internal die volume 182 and the punch die 100 external environment. The groove 166 and tongue 164 can have a circular shape as illustrated in the figures (e.g., a cylindrical ring tongue and corresponding groove cavity) or any other shape such as square, rectangular, oval, irregular, or otherwise depending of the shape of the dies 120, 140 and punch cavities 126, 146. The groove 166 and tongue 164 generally extend in the axial directions A and/or P defined by the die cavity 126 and/or punch 200 (e.g., aligned with the path of A and/or P, but in the same or opposite directions, such as perpendicular to the clamping surfaces 124, 144). The embodiment illustrated in FIGS. 4-7 is particularly suitable when the punch die 100 is aligned such that the upper die-to-lower die and punch-extension direction corresponds to a direction of gravitational pull G. In this case, the tongue 164 provides a small, open reservoir to retain forming fluid that may still be present in the lower die 140 and/or drain from the upper die 120 after the forming process and disengagement of the upper and lower dies 120, 140. When the punch die 100 is aligned in a opposite direction relative to gravity (e.g., where the upper die 120 is positioned below the lower die 140, and the punch 200 extends upwardly during forming relative to gravity G), the tongue 164 similarly is suitably positioned on the upper die 120 to provide an analogous forming fluid drainage reservoir.

In a refinement of the illustrated tongue-in-groove embodiments, at least one of the groove 166 and the tongue 164 further includes one or more sealing elements 168, for example a ring seal or gasket (e.g., formed from any common polymeric rubbers, metals, or otherwise) on inner and/or outer sides of the groove 166 sidewall and/or tongue 164 sidewall. In embodiments, the tongue 164 and/or groove 166 includes a plurality of seals 168 at different heights (tongue) or depths (groove) (FIG. 7), thus increasing the integrity of the circumferential seal 162 and providing a sealed internal punch die 100 volume and clamping cavity 182 volume over a range of gap heights H (i.e., where at least one seal maintains tongue-groove contact to maintain the circumferential seal 162, even if some seals 168 are not in contact with two opposing tongue-groove surfaces). Suitable seals are able to accommodate at least 200, 500, 1000, or 2000 psi and/or up to 2000, 3000, 5000, or 10000 psi. Common polymer/rubber-based seals are typically suitable up to about 5000 psi, while metal seals can be used up to about 10000 psi. The seals additionally are suitably temperature-resistant at common forming temperatures, such as at least 100, 150, 200, 300, or 400° F. and/or up to 200, 300, 400, or 500° F.

In a refinement (FIG. 5), the upper die 120 further includes a seal 126A adapted to provide a pressure-resistant interface the punch cavity 126 and the punch 200, when the punch 200 is present in the punch cavity 126 (e.g., a seal or gasket circumferentially positioned around the punch cavity 126 wall, such as seated in a seal retainer groove 126B or cavity positioned at the top surface of the upper die). Suitable seals 126A can include those as described above for the seal 168 with respect to materials, pressure tolerances, and temperature tolerances.

In a refinement (FIG. 5), the upper die 120 further defines one or more channels 128 (illustrated with threaded inlet orifices) providing fluid communication between the punch cavity 126 and an external surface of the upper die 120 (e.g., an outer wall between the top surface 122 and the lower clamping surface 124 of the upper die 120; to provide a liquid or gas inlet or outlet to the cavity 126). For example, the upper die 120 can define an air exhaust channel 128C (e.g., providing fluid communication between the punch cavity 126 and the external/ambient environment to the upper die 120; suitably positioned above the forming fluid ports, for example having an inlet to the punch cavity 126 closer to the top surface 122 relative to the punch cavity 126 inlets for the forming fluid ports). Additionally or alternatively, the upper die 120 can define a forming fluid inlet channel 128A and/or a forming fluid outlet channel 128B (e.g., providing fluid communication between the punch cavity 126 and the same or different forming fluid reservoirs 450).

In a refinement (FIG. 4), the lower die 140 further defines one or more channels 148 providing fluid communication between the forming cavity 146 and an external surface of the lower die 140 (e.g., an outer wall between the upper clamping surface 142 and the bottom surface 141 of the lower die 140). For example, the lower die 140 can define a forming fluid inlet channel 148A and/or a forming fluid outlet channel 148B (e.g., providing fluid communication between the forming cavity 146 and the same or different forming fluid reservoirs 450; illustrated as threaded inlet/outlet orifices).

Figure 19:
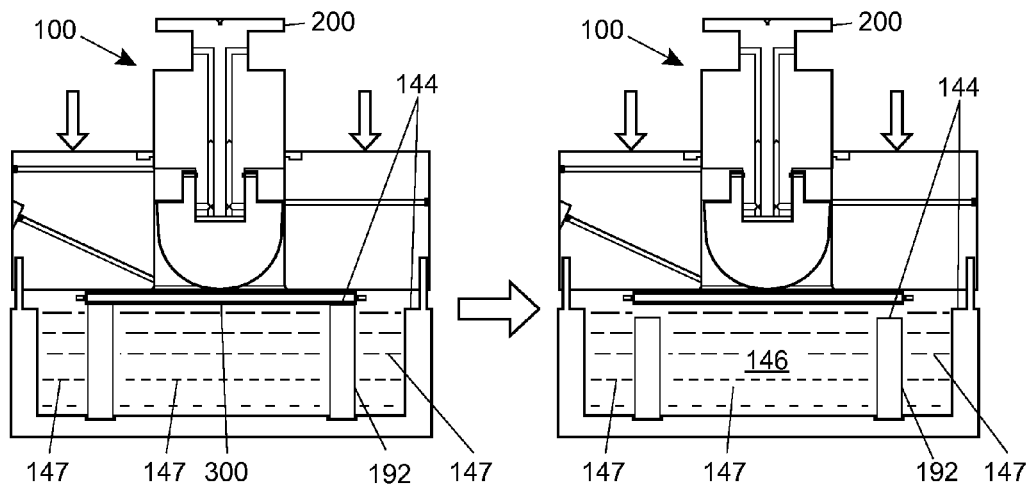
FIG. 19 illustrates additional clamping devices that may be utilized before hydrostatic clamping is initiated. This figure highlights a method which uses retractable columns to hold the blank sandwich against the upper zone die clamping surface. Once the fluid cavity is pressurized, the columns can be retracted and the blank sandwich will be held in place by hydro-static clamping.

In a refinement (FIG. 19), the lower die 140 upper clamping surface 144 further includes a means 192 for positioning a blank 300 adjacent the lower clamping surface 124 (e.g., (vertically) extendable/retractable rams, rods, or other support surface(s) which form at least a portion of the upper clamping surface 144 and are moveably positioned in the forming cavity 146 and able to clamp the blank 300 against the lower clamping surface 124; once pressurized forming fluid is in the die interior, the rams, etc. retract to initiate hydrostatic clamping as illustrated in FIG. 19).

In a refinement with a multi-cavity/multi-punch die 100A (FIG. 20), (i) the upper die 120 defines a plurality of punch cavities 126; (ii) the lower die 140 defines a plurality of forming cavities 146 corresponding to the punch cavities 126; and (iii) the plurality of punch cavities 126 and the plurality of forming cavities 146 are in fluid communication with each other via the interfacial clamping cavity 182 (e.g., when the blanks 300 and punches 200 are absent).

In a refinement (FIG. 21), the punch die 100 further includes a means 194 for trimming a formed blank 300A (e.g., (horizontally) extendable/retractable blades or other trimming tool that is retracted during the forming process, but which can extend into the forming cavity 146 after the blank 300 has been formed into a punched/shaped part 300A to remove excess blank 300 material from the outer region of the blank 300, such as illustrated in FIG. 21).

In a refinement (FIG. 22), the punch die 100 further includes a means 196 for ejecting a formed blank 300A (e.g., (vertically) extendable/retractable ram, rod, or other support surface moveably positioned in the forming cavity 146 that is retracted during the forming process, but which can extend after the forming process to eject the formed blank 300A from the forming cavity 146, such as illustrated in FIG. 22).

In another aspect, with particular reference to FIGS. 2-3, the disclosure relates to a thermohydroforming press 400 assembly including: (a) a punch die 100 in any of its various embodiments disclosed herein; and (b) a punch 200 positioned relative to the punch die 100 and adapted to extend through the punch cavity 126 and at least partially into the forming cavity 146 (e.g., a punch 200 and corresponding extending means 434 such as punch hydraulic ram 434 mounted to a support such as a support plate as illustrated in FIGS. 2-3, where the punch 200 is axially aligned with the punch cavity 126 of the upper die 120). The thermohydroforming press 400 can further include: (c) a press base 410 to which the lower die 140 is mounted (e.g., having a fixed axial position but being removably positioned on an upper support surface of the press base 410); (d) one or more axial support members 420 mounted to the press base 410 at a first end of the support members 420 and extending axially upward from the press base 410 and above the lower die 140; (e) a fixed support 430 mounted to the support members 420 at a second end opposing the first end of the support members 420; and/or (f) an axially traversable clamping plate 440 moveably mounted to the fixed support 430, the clamping plate 440 further having the upper die 120 mounted thereto. The clamping plate 440 is axially moveable to engage the upper die 120 and the lower die 140 to form the interfacial clamping cavity volume 182 and the circumferential seal 162 between the lower clamping surface 124 and the upper clamping surface 144. As illustrated in FIGS. 2-3, the thermohydroforming press 400 assembly can further include hydraulic clamping rams 432, punch hydraulic rams 434, or other means for axial extension mounted to the fixed support 430 or the axially traversable clamping plate 440 to move/extend the axially traversable clamping plate 440 and/or the punch 200.

In a refinement (FIG. 1), the thermohydroforming press 400 assembly can further include a forming fluid reservoir 450 in fluid communication with the forming cavity 146 (e.g., in fluid communication with a fluid inlet 148A and a fluid outlet 148B of the forming cavity 146; for example including multiple reservoirs such as a cool reservoir connected to the forming cavity outlet, a heater/hot reservoir connected to the forming cavity inlet, and a fluid connection between the two reservoirs to create a forming fluid recycle loop as illustrated in FIG. 1).

Figure 8:
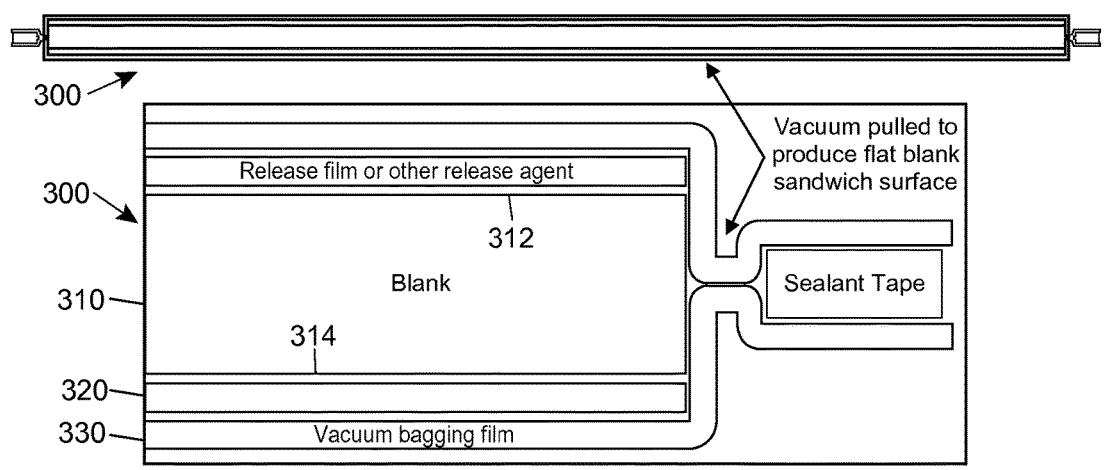
FIG. 8 is a cut section view of the blank sandwich, where the bottom view is an expanded view of the right side of the top view. The blank is central to the bagging system and is enveloped in a release film. A different type of release agent may be applied if film is not preferred. This is placed in between two pieces of vacuum bagging film and sealed using sealing tape. A vacuum is pulled in the bag before it is completely sealed. This gives the upper and lower surfaces of the blank sandwich a smooth surface. This smooth surface improves the forming process as the punch is drawn through the blank, facilitating in-plane part shearing and wrinkle-free part formation. This system can be used with a blank of any geometry.
Figure 9:
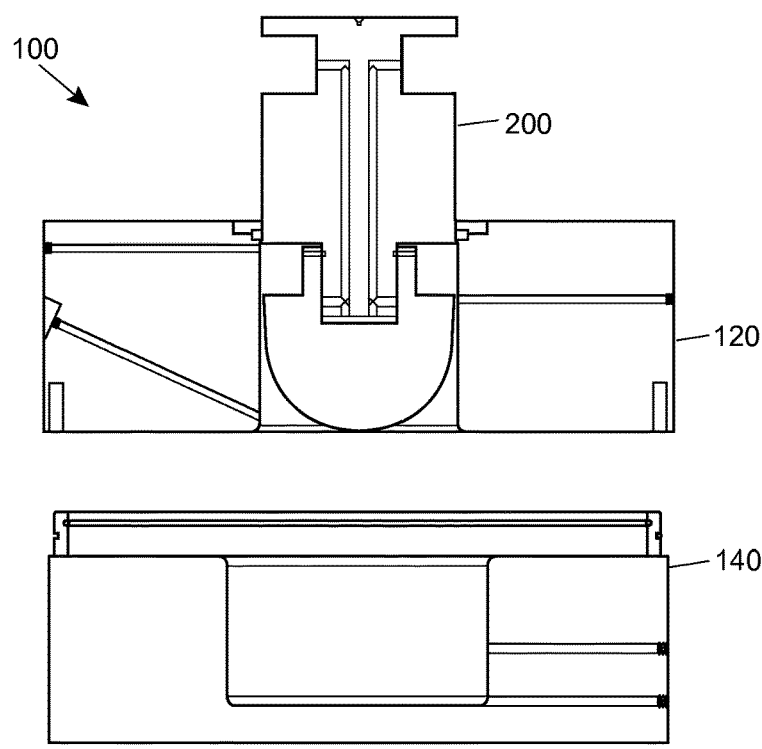
FIG. 9 illustrates step one of a representative forming process. The upper zone die and punch are lifted up to allow easy access the interior of the dies. The blank sandwich is laid up and preheated to a desired forming temperature (not pictured).

In another aspect, with particular reference to FIGS. 8, 17, and 18, the disclosure relates to thermohydroforming blank 300 including: (a) a blank substrate 310 having a top surface 312 and a bottom surface 314 opposing the top surface 312 (e.g., generally a flay, planar, or otherwise sheet-shaped structure); (b) an optional release coating 320 on the top surface 312 and the bottom surface 314 of the blank substrate 310; and (c) a vacuum-sealed film 330 (e.g., a nylon bagging film) enclosing the blank substrate 310 (e.g., and in contact with the blank substrate 310 or the release coating 320 thereon when present). The thickness of the blank 300 can be selected based on the desired properties of the formed part, for example a thickness of at least 1 mm, 2 mm, 5 mm, or 10 mm and/or up to 5 mm, 10 mm, 15 mm, 20 mm, 25 mm, or 30 mm, whether for composite or metal blank materials. The particular maximum thickness for a given thermohydroforming press 400 depends, for example, upon the tonnage of the hydraulic press and the thermo-hydroforming maximum pressure capability.

In a refinement, the blank substrate 310 is formed from a polymer composite material, for example including a composite material with a thermoplastic or thermoset polymer matrix and a reinforcement material (e.g., fibers, platelets, or otherwise). Examples of suitable thermoplastics include polyethylenes, polypropylenes, other polyolefins, polystyrenes, polycarbonates, poly(meth)acrylics, poly(meth)acrylates, polyamides (nylons), polyimides, polyvinyl chlorides, polyesters, combinations thereof, and derivatives thereof. Examples of suitable thermosets include epoxy resins, polyurethanes, polyester resins, polyimides, melamine resins, phenol-formaldehyde resins, urea-formaldehyde resins, combinations thereof, and derivatives thereof (e.g., a partially or incompletely cured thermoset material). Examples of suitable reinforcement arrangements include discontinuous random fibers or platelets, discontinuous aligned fibers or platelets, continuous aligned fibers, and continuous woven or braided fibers. Examples of suitable reinforcements include glass fibers, carbon fibers, polymeric fibers, cellulosic fibers, carbon nanotubes, and (exfoliated) graphite or graphene platelets. Such composite materials are suitable for the blank substrate 310 and can be used in a blank 300, with or without the release coating 320 and/or the film 330.

The sealing film should be temperature-resistant with respect to the forming temperature experienced within the die (e.g., a thermoplastic sealing film with a melting temperature above the forming temperature in the punch die based on the particular blank material used; a thermoplastic sealing film with a glass transition temperature above or below the forming temperature in the punch die based on the particular blank material used). The sealing film also suitably is sufficiently elastic to deform without breaking or tearing during the forming process (e.g., able to maintain structural integrity and conform to the blank substrate 310 as it is deformed during the forming process). The (vacuum) sealing film suitably can be formed from any of a variety of thermoplastic materials (e.g., thermoplastic elastomers) such as polyethylenes, polypropylenes, other polyolefins, polystyrenes, polycarbonates, poly(meth)acrylics, poly (meth)acrylates, polyamides (nylons), polyimides, polyvinyl chlorides, polyesters, combinations thereof, and derivatives thereof. Common commercially available sealing films are formed from polyamides (nylons) and polyethylenes or other polyolefins (e.g., IPPLON DPT1000 nylon vacuum bagging film, available from Airtech Europe Sari, Luxembourg). The release coating is suitably a thin, polymeric film having non-stick or low-stick surface properties. The release coating similarly should be temperature-resistant and sufficiently elastic to withstand the forming process. Examples of suitable polymeric films usable as release coatings include various fluorinated or perfluorinated polymers and copolymers such as polytetrafluoroethlyene (PTFE or TEFLON), poly(ethylene-co-tetrafluoroethlyene) (ETFE), poly(tetrafluoroethlyene-co-hexafluoropropylene) (FEP), and polyvinyl fluoride (PVF). Other polymeric films usable as release coatings include various polyolefin (e.g., polymethylpentene), polyethylene terephthalate, and polyimide films.

In another aspect, with particular reference to FIGS. 9-18, the disclosure relates to a thermohydroforming method including: (a) providing a thermohydroforming press 400 assembly according to any of the various embodiments disclosed herein; (b) filling the forming cavity 146 with a forming fluid (e.g., heated forming fluid at about or above the forming temperature of the blank 300 to be formed); (c) placing a thermohydroforming blank 300 on the upper clamping surface 144 of the lower die 140 (e.g., a planar/sheet blank 300 formed from a polymer composite material, a polymer material (e.g., without a composite reinforcement), a metal material, combinations thereof (e.g., layered/lamellar material including a polymer composite layer and a metal layer, for example), with or without a release coating 320 and/or vacuum-sealed film 330); (d) engaging the upper die 120 and the lower die 140 (i) to contact the lower clamping surface 124 of the upper die 120 with the thermohydroforming blank 300 (e.g., applying a light mechanical clamping force on the blank 300 with the lower and upper clamping surfaces 124,144 of the two dies 120, 140) and (ii) to define the interfacial clamping cavity 182 and the circumferential seal 162 therefor; (e) expanding the interfacial clamping cavity 182 volume (e.g., raising the upper die 120, lowering the lower die 140, or both) with the forming fluid under pressure, thereby (i) flooding the circumferentially sealed interfacial clamping cavity 182 and forming cavity 146 with forming fluid and (ii) disengaging the blank 300 from the upper clamping surface 144 of the lower die 140 to hydrostatically clamp the blank 300 against the lower clamping surface 124 of the upper die 120; (f) extending the punch 200 through the punch cavity 126 to contact the blank 300 and to form a die-punched formed blank 300A (e.g., deforming a central portion of the blank 300 according to the punch 200 shape while maintaining contact of an outer portion of the blank 300 to the lower clamping surface 124 to maintain hydrostatic clamping); (g) circulating forming fluid through the forming cavity 146 (e.g., and in the interfacial clamping cavity 182) and in contact with the formed blank 300A (e.g., hot forming fluid to accelerate curing of a thermoset polymer composite; cold forming fluid to cool formed blank below forming temperature, for example for a thermoplastic polymer composite); (h) disengaging the upper die 120 and the lower die 140; and (i) removing the formed blank 300A from the punch die 100.

In another aspect, with particular reference to FIGS. 9-18, the disclosure relates to a thermohydroforming method including: (a) providing a thermohydroforming press 400 assembly according to any of the various embodiments disclosed herein; (b) hydrostatically clamping a thermohydroforming blank 300 (e.g., a blank 300 with or without the release coating 320 and/or the film 330) against the lower clamping surface 124 of the upper die 120 with pressurized forming fluid flooding the forming cavity 146 and the circumferentially sealed interfacial clamping cavity 182, the blank 300 being disengaged from the upper clamping 144 surface of the lower die 140; and (c) extending the punch 200 through the punch cavity 126 to contact the blank 300 and to form a die-punched formed blank 300A (e.g., while the blank 300 is disengaged from the lower die 140).

In another aspect, the disclosure relates to a thermohydroforming method including: (a) providing a thermohydroforming blank 300 including the enclosing film 330 in any of its various embodiments disclosed herein; (b) clamping the thermohydroforming blank 300 against one or more clamping surfaces of a punch die containing pressurized forming fluid in a forming cavity of the punch die (e.g., hydrostatically clamping using a punch die 100 as disclosed herein; mechanically clamping both top and bottom surfaces of the blank using a conventional punch die and thermohydroforming press such as disclosed in U.S. Pat. No. 6,631,630); and (c) extending a punch through a punch cavity of the punch die to contact the blank and to form a die-punched formed blank in the forming cavity.

In embodiments of the various thermohydroforming methods, process temperatures (e.g., temperature of blank 300, forming fluid, and/or die 100 components) are suitably within about 5° F., 10° F., 15° F., 20° F., or 25° F. of the forming temperature (e.g., at or above the forming temperature within the given range) for the blank 300 material, for example within or above the indicated ranges relative to a glass transition temperature for a thermoplastic composite material. Example forming (glass transition) temperatures are between about 200° F. to 250° F. for common polyethylenes and between about 300° F. to 400° F. for common polypropylenes. In other embodiments, process pressures are suitably determined according to the thickness of the blank 300 and the mechanical properties of its material, but generally forming pressures are at least 100, 200, 500, 1000, or 2000 psi and/or up to 1000, 2000, 3000, or 5000 psi. The foregoing pressures are suitable for absolute or gauge pressures in the forming cavity 146 and/or for differential pressures between a high-pressure forming cavity 146 and a low-pressure punch cavity 126 (e.g., when forming fluid is present in both cavities 126, 146). In some embodiments, pressure is applied only in the forming cavity 146 (e.g., a single-sided pressure application when no pressure is applied in the punch cavity 126), and such embodiments can provide a formed part with reduced wrinkling related to an embodiment with non-zero applied absolute or gauge pressures in both cavities 126, 146.

In a refinement of the various thermohydroforming methods, the method further includes preheating the thermohydroforming blank 300 before placing the blank 300 into the punch die 100 (e.g., to a temperature at about or above the forming temperature of the blank substrate 310 material).

In a refinement of the various thermohydroforming methods, the method further includes heating one or more of the upper die 120, the lower clamping surface 124 thereof, the lower die 140, the upper clamping surface 144 thereof, and the punch 200 (e.g., to a temperature at about or above the forming temperature of the blank substrate 310 material).

In a refinement of the various thermohydroforming methods, placing the thermohydroforming blank 300 on the upper clamping surface 124 further includes aligning the blank 300 to maintain at least partial contact of the blank 300 with the lower clamping surface 124 during a subsequent forming step (e.g., to ensure that the blank 300 is indexed to achieve the desired shape in the final formed blank 300A and to maintain hydrostatic clamping during forming).

In a refinement of the various thermohydroforming methods, (i) the thermoforming blank 300 is a blank 300 including the film 330 and optionally the release coating 320; and (ii) the method further includes removing the vacuum-sealed film 330 from the formed blank 300A (e.g., before or after removal of the blank 300A from the punch die 100).

In a refinement of the various thermohydroforming methods, the forming fluid can include one or more of vegetable oils, petroleum-based oils, silicon-based oils (e.g., DYNALENE-600, a silicone heat transfer fluid operable up to about 550° F.), other synthetic oils, water, aqueous solutions, and combinations thereof.

In a refinement of the various thermohydroforming methods, the formed blank 300A is in the form of a piece of personal protective equipment, an automotive body part, a plane body part, a boat body part, or an electronic device protective shell or casing.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the articles, compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS SUMMARY

100: punch die (multi-chamber/multi-punch die 100A)
120: upper die
122: upper die top surface
124: upper die lower clamping surface
126: upper die punch cavity (axial direction A; seal 126A; seal retainer groove 126B)
128: upper die channel (fluid inlet 128A, fluid outlet 128B, air exhaust 128C)
140: lower die
142: lower die bottom surface
144: lower die upper clamping surface
146: lower die (fluid) forming cavity
147: oil or fluid
148: lower die channel (fluid inlet 148A, fluid outlet 148B)
160: means for moveably connecting and circumferentially sealing
162: circumferential seal
164: tongue
166: groove
168: tongue/groove sealing element
180: interfacial region
182: variable-volume interfacial clamping cavity (height H)
192: means for positioning a blank
194: means for trimming a formed blank
196: means for ejecting a formed blank
200: punch (direction of travel P)
300: thermohydroforming blank (substrate 310, top surface 312; bottom surface 314)
300A: formed blank
320: release coating
330: enclosing film
400: thermohydroforming press assembly
410: press base
420: axial support members
430: fixed support (hydraulic clamps 432, punch hydraulic ram 434)
440: axially traversable clamping plate
450: forming fluid reservoir
G: direction of gravitational pull

What is claimed is:

1. A thermohydroforming method comprising:
    (a) providing a thermohydroforming press assembly comprising:
        (i) a punch die comprising:
            (A) an upper die having a top surface and a lower clamping surface opposing the top surface, the upper die defining a punch cavity extending through the upper die, the punch cavity being adapted to receive a punch; and
            (B) a lower die having a bottom surface and an upper clamping surface opposing the bottom surface, the lower die defining a forming cavity extending into the lower die through the upper clamping surface and being bounded below, the forming cavity being adapted to receive a punch extending completely through the punch cavity and at least partially into the forming cavity;
            wherein at least one of the upper die and the lower die comprise a means for moveably connecting and circumferentially sealing the upper die and the lower die at an interfacial region between the lower clamping surface and the upper clamping surface such that, when the upper die and the lower die are moveably connected and circumferentially sealed:
                the upper die and the lower die together define a variable-volume interfacial clamping cavity between the lower clamping surface and the upper clamping surface,
                the interfacial clamping cavity is in fluid communication with the punch cavity and the forming cavity, and
                the upper die and the lower die are moveable relative to each other to vary the interfacial clamping cavity volume while maintaining a circumferential seal between the lower clamping surface and the upper clamping surface; and
        (ii) a punch positioned relative to the punch die and adapted to extend through the punch cavity and at least partially into the forming cavity;
    (b) hydrostatically clamping a thermohydroforming blank against the lower clamping surface of the upper die with pressurized forming fluid flooding the forming cavity and the circumferentially sealed interfacial clamping cavity, the blank being disengaged from the upper clamping surface of the lower die; and (c) extending the punch through the punch cavity to contact the blank and to form a die-punched formed blank.

2. A thermohydroforming method comprising:
(a) providing a thermohydroforming press assembly comprising:
  (i) a punch die comprising:
    (A) an upper die having a top surface and a lower clamping surface opposing the top surface, the upper die defining a punch cavity extending through the upper die, the punch cavity being adapted to receive a punch; and
    (B) a lower die having a bottom surface and an upper clamping surface opposing the bottom surface, the lower die defining a forming cavity extending into the lower die through the upper clamping surface and being bounded below, the forming cavity being adapted to receive a punch extending completely through the punch cavity and at least partially into the forming cavity;
    wherein at least one of the upper die and the lower die comprise a means for moveably connecting and circumferentially sealing the upper die and the lower die at an interfacial region between the lower clamping surface and the upper clamping surface such that, when the upper die and the lower die are moveably connected and circumferentially sealed:
      the upper die and the lower die together define a variable-volume interfacial clamping cavity between the lower clamping surface and the upper clamping surface,
      the interfacial clamping cavity is in fluid communication with the punch cavity and the forming cavity, and
      the upper die and the lower die are moveable relative to each other to vary the interfacial clamping cavity volume while maintaining a circumferential seal between the lower clamping surface and the upper clamping surface; and
  (ii) a punch positioned relative to the punch die and adapted to extend through the punch cavity and at least partially into the forming cavity;
(b) filling the forming cavity with a forming fluid;
(c) placing a thermohydroforming blank on the upper clamping surface of the lower die;
(d) engaging the upper die and the lower die (i) to contact the lower clamping surface of the upper die with the thermohydroforming blank and (ii) to define the interfacial clamping cavity and the circumferential seal therefor;
(e) expanding the interfacial clamping cavity volume with the forming fluid under pressure, thereby (i) flooding the circumferentially sealed interfacial clamping cavity and forming cavity with forming fluid and (ii) disengaging the blank from the upper clamping surface of the lower die to hydrostatically clamp the blank against the lower clamping surface of the upper die;
(f) extending the punch through the punch cavity to contact the blank and to form a die-punched formed blank;
(g) circulating forming fluid through the forming cavity and in contact with the formed blank;
(h) disengaging the upper die and the lower die; and
(i) removing the formed blank from the punch die.

3. The method of claim 2, wherein the punch cavity defines an axial direction corresponding to a direction of travel of the punch when the punch extends through the punch cavity.

4. The method of claim 2, wherein:
  (i) the upper die defines a groove cavity having an open area at the lower clamping surface circumferentially enclosing the punch cavity at the lower clamping surface;
  (ii) the lower die further comprises a tongue extending outwardly from the upper clamping surface and circumferentially enclosing the forming cavity at the upper clamping surface; and
  (iii) the groove and the tongue have shapes adapted to mate to each other and form the circumferential seal between the lower clamping surface and the upper clamping surface when the upper die and the lower die are moveably connected.

5. The method of claim 4, wherein at least one of the groove and the tongue further comprises a sealing element.

6. The method of claim 2, wherein:
  (i) the lower die defines a groove cavity having an open area at the upper clamping surface circumferentially enclosing the forming cavity at the upper clamping surface;
  (ii) the upper die further comprises a tongue extending outwardly from the lower clamping surface and circumferentially enclosing the punch cavity at the lower clamping surface; and
  (iii) the groove and the tongue have shapes adapted to mate to each other and form the circumferential seal between the lower clamping surface and the upper clamping surface when the upper die and the lower die are moveably connected.

7. The method of claim 2, wherein the upper die further comprises a seal adapted to provide a pressure-resistant interface between the punch cavity and the punch, when the punch is present in the punch cavity.

8. The method of claim 2, wherein the upper die further defines one or more channels providing fluid communication between the punch cavity and an external surface of the upper die.

9. The method of claim 8, wherein the upper die defines an air exhaust channel.

10. The method of claim 8, wherein the upper die defines a forming fluid inlet channel and a forming fluid outlet channel.

11. The method of claim 2, wherein the lower die further defines one or more channels providing fluid communication between the forming cavity and an external surface of the lower die.

12. The method of claim 11, wherein the lower die defines a forming fluid inlet channel and a forming fluid outlet channel.

13. The method of claim 2, wherein:
  (i) the upper die defines a plurality of punch cavities;
  (ii) the lower die defines a plurality of forming cavities corresponding to the punch cavities; and
  (iii) the plurality of punch cavities and the plurality of forming cavities are in fluid communication with each other via the interfacial clamping cavity.

14. The method of claim 2, wherein the lower die upper clamping surface comprises a means for positioning the blank adjacent the lower clamping surface.

15. The method of claim 2, wherein the punch die further comprises a means for trimming the formed blank.

16. The method of claim 2, wherein the punch die further comprises a means for ejecting the formed blank.

17. The method of claim 2, wherein the thermohydroforming press assembly further comprises:
(c) a press base to which the lower die is mounted;
(d) one or more axial support members mounted to the press base at a first end of the support members and extending axially upward from the press base and above the lower die;
(e) a fixed support mounted to the support members at a second end opposing the first end of the support members; and
(f) an axially traversable clamping plate moveably mounted to the fixed support, the clamping plate further having the upper die mounted thereto;
wherein the clamping plate is axially moveable to engage the upper die and the lower die to form the interfacial clamping cavity volume and the circumferential seal between the lower clamping surface and the upper clamping surface.

18. The method of claim 2, wherein the thermohydroforming press assembly further comprises a forming fluid reservoir in fluid communication with the forming cavity.

19. The method of claim 2, further comprising preheating the thermohydroforming blank before placing the blank into the punch die.

20. The method of claim 2, further comprising heating one or more of the upper die, the lower clamping surface thereof, the lower die, the upper clamping surface thereof, and the punch.

21. The method of claim 2, wherein part (c) comprises aligning the blank to maintain at least partial contact of the blank with the lower clamping surface during forming part (f).

22. The method of claim 2, wherein:
(i) the thermoforming blank comprises: (A) a blank substrate having a top surface and a bottom surface opposing the top surface; (B) a release coating on the top surface and the bottom surface of the blank substrate; and (C) a vacuum-sealed film enclosing the blank substrate and in contact with the release coating thereon; and
(ii) the method further comprises removing the vacuum-sealed film from the formed blank.

23. The method of claim 2, wherein the forming fluid is selected from the group consisting of vegetable oils, petroleum-based oils, silicon-based oils, other synthetic oils, water, aqueous solutions, and combinations thereof.

24. The method of claim 2, wherein the formed blank is in the form of a piece of personal protective equipment, an automotive body part, a plane body part, a boat body part, or an electronic device protective shell or casing.

* * * * *